(12) United States Patent
Sercombe et al.

(10) Patent No.: US 12,244,187 B2
(45) Date of Patent: Mar. 4, 2025

(54) ELECTRIC PROPULSION SYSTEM FOR DELIVERING HIGH TORQUE

(71) Applicant: MagniX USA, Inc., Redmond, WA (US)

(72) Inventors: David B. T. Sercombe, Arundel (AU); Roei Ganzarski, Redmond, WA (US)

(73) Assignee: MAGNIX USA, INC., Everett, WA (US)

( * ) Notice: Subject to any disclaimer, the term of this patent is extended or adjusted under 35 U.S.C. 154(b) by 413 days.

(21) Appl. No.: 16/889,246

(22) Filed: Jun. 1, 2020

(65) Prior Publication Data
US 2020/0381985 A1   Dec. 3, 2020

Related U.S. Application Data

(60) Provisional application No. 62/855,143, filed on May 31, 2019, provisional application No. 62/855,151,
(Continued)

(51) Int. Cl.
*H02K 16/00* (2006.01)
*B64D 27/24* (2006.01)
(Continued)

(52) U.S. Cl.
CPC ............ *H02K 16/00* (2013.01); *B64D 27/24* (2013.01); *B64D 31/02* (2013.01); *B64D 33/08* (2013.01);
(Continued)

(58) Field of Classification Search
CPC ........ H02K 16/00; H02K 5/203; H02K 5/225; H02K 7/116; H02K 9/19; H02K 11/21;
(Continued)

(56) References Cited

U.S. PATENT DOCUMENTS

| 2,635,699 A | 4/1953 | Richmond et al. |
| 3,781,616 A | 12/1973 | Mokryzki et al. |

(Continued)

FOREIGN PATENT DOCUMENTS

| CN | 101771267 A | 7/2010 |
| CN | 202307414 U | 7/2012 |

(Continued)

OTHER PUBLICATIONS

Office Action dated Aug. 25, 2022 received in U.S. Appl. No. 16/888,809, 24 pages.

(Continued)

*Primary Examiner* — Jose A Gonzalez Quinones
(74) *Attorney, Agent, or Firm* — Scully, Scott, Murphy & Presser, P.C.

(57) ABSTRACT

A system to convert electrical power to torque is disclosed where the system includes one or more motor controllers, each motor controller adapted and configured to receive power input commands and to receive high-voltage, direct-current (HVDC) input power and convert the HVDC input power to multiphase high-voltage, alternating-current (HVAC) output power, wherein each motor controller varies its respective multiphase HVAC output power in response to the power input commands received; and an electric motor assembly having a main shaft for supplying torque, the electric motor configured and adapted to receive input power as multiphase HVAC from the one or more motor controllers to rotate the main shaft. The system in an embodiment is configured as a propulsion system, wherein the shaft of the electric motor assembly is configured to supply torque to a propulsor of an aircraft.

19 Claims, 7 Drawing Sheets

Related U.S. Application Data filed on May 31, 2019, provisional application No. 62/855,147, filed on May 31, 2019.

(51) Int. Cl.

| | | |
|---|---|---|
| *B64D 31/02* | (2006.01) | |
| *B64D 33/08* | (2006.01) | |
| *B64D 41/00* | (2006.01) | |
| *F16H 57/04* | (2010.01) | |
| *H02J 7/34* | (2006.01) | |
| *H02K 5/20* | (2006.01) | |
| *H02K 5/22* | (2006.01) | |
| *H02K 7/116* | (2006.01) | |
| *H02K 9/197* | (2006.01) | |
| *H02K 11/21* | (2016.01) | |
| *H02K 11/30* | (2016.01) | |
| *H02P 6/10* | (2006.01) | |
| *H02P 25/16* | (2006.01) | |
| *H02P 27/08* | (2006.01) | |

(52) U.S. Cl.
CPC ......... *B64D 41/00* (2013.01); *F16H 57/0476* (2013.01); *H02J 7/345* (2013.01); *H02K 5/203* (2021.01); *H02K 5/225* (2013.01); *H02K 7/116* (2013.01); *H02K 9/197* (2013.01); *H02K 11/21* (2016.01); *H02K 11/30* (2016.01); *H02P 6/10* (2013.01); *H02P 25/16* (2013.01); *H02P 27/08* (2013.01); *B64D 2221/00* (2013.01); *H02K 2213/06* (2013.01)

(58) Field of Classification Search
CPC .... H02K 11/30; H02K 2213/06; H02K 9/197; H02K 9/12; B64D 27/24; B64D 31/02; B64D 33/08; B64D 41/00; B64D 2221/00; B64D 31/00; F16H 57/0476; H02J 7/345; H02P 6/10; H02P 25/16; H02P 27/08; H02P 29/60; Y02T 10/70; Y02T 50/40; Y02T 50/60; B60L 50/51
USPC ......................... 310/54, 52, 58–59
See application file for complete search history.

(56) References Cited

U.S. PATENT DOCUMENTS

| | | |
|---|---|---|
| 4,418,777 A | 12/1983 | Stockton |
| 4,743,828 A | 5/1988 | Jahns et al. |
| 5,982,067 A | 11/1999 | Sebastian et al. |
| 7,053,508 B2 | 5/2006 | Kusase et al. |
| 7,462,968 B2 | 12/2008 | Kusase et al. |
| 7,990,011 B2 | 8/2011 | Yoshino et al. |
| 8,405,479 B1 | 3/2013 | Cleveland |
| 8,476,989 B2 | 7/2013 | Herron et al. |
| 8,575,880 B2 | 11/2013 | Grantz |
| 8,653,710 B2 | 2/2014 | Takahashi et al. |
| 8,786,156 B2 | 7/2014 | Hino et al. |
| 8,842,452 B2 | 9/2014 | Nielsen |
| 9,221,326 B2 | 12/2015 | Steffen et al. |
| 9,236,775 B2 | 1/2016 | Takahashi et al. |
| 9,270,154 B2 | 2/2016 | Hibbs et al. |
| 9,450,461 B2 | 9/2016 | Labbe et al. |
| 9,479,037 B2 | 10/2016 | Bailey et al. |
| 9,559,554 B2 | 1/2017 | Gasparin et al. |
| 9,595,705 B1 | 3/2017 | Buckhout |
| 9,755,463 B2 | 9/2017 | Klassen et al. |
| 9,853,588 B2 | 12/2017 | Green et al. |
| 9,943,016 B2 | 4/2018 | Pietrantonio et al. |
| 10,008,912 B2 | 6/2018 | Davey et al. |
| 10,123,450 B2 | 11/2018 | Sarti |
| 10,247,758 B2 | 4/2019 | Milano et al. |
| 10,272,767 B1 | 4/2019 | Tang et al. |
| 10,326,344 B2 | 6/2019 | Hamann et al. |
| 10,660,196 B2 | 5/2020 | Amaducci et al. |
| 2004/0111869 A1 | 6/2004 | Mikkelsen |
| 2007/0176499 A1 | 8/2007 | Holmes et al. |
| 2008/0019062 A1 | 1/2008 | Dooley |
| 2009/0195090 A1 | 8/2009 | Rittenhouse |
| 2010/0038473 A1 | 2/2010 | Schneider et al. |
| 2010/0046129 A1 | 2/2010 | Mikrut |
| 2010/0097169 A1 | 4/2010 | Earle |
| 2011/0024567 A1 | 2/2011 | Blackwelder et al. |
| 2011/0133580 A1* | 6/2011 | Sugimoto ............... H02K 1/20 310/54 |
| 2011/0138765 A1* | 6/2011 | Lugg ................. F02K 1/08 310/90.5 |
| 2012/0025032 A1* | 2/2012 | Hopdjanian ............ B64C 27/14 903/905 |
| 2012/0055727 A1 | 3/2012 | Omiya et al. |
| 2012/0126731 A1 | 5/2012 | Wyrembra |
| 2012/0153718 A1 | 6/2012 | Rawlinson et al. |
| 2012/0194040 A1 | 8/2012 | Hao et al. |
| 2012/0257429 A1* | 10/2012 | Dong ................... H02M 3/1582 363/127 |
| 2012/0262019 A1 | 10/2012 | Smith et al. |
| 2013/0285485 A1 | 10/2013 | Song et al. |
| 2014/0022681 A1 | 1/2014 | Mitsutani |
| 2014/0042948 A1 | 2/2014 | Green et al. |
| 2014/0056726 A1* | 2/2014 | Garrard ............... H02K 9/19 417/372 |
| 2014/0070634 A1 | 3/2014 | Legros et al. |
| 2014/0139161 A1 | 5/2014 | Ueda |
| 2014/0167548 A1 | 6/2014 | Kong |
| 2014/0191613 A1 | 7/2014 | Mariotto |
| 2014/0361646 A1 | 11/2014 | Saito et al. |
| 2015/0018168 A1 | 1/2015 | Davey et al. |
| 2015/0061440 A1 | 3/2015 | Catalan |
| 2015/0091486 A1* | 4/2015 | Chandrasekharan ....... H02P 29/0241 318/490 |
| 2015/0093272 A1* | 4/2015 | Komer ................ B64C 11/44 417/423.1 |
| 2015/0180296 A1 | 6/2015 | Ravaud et al. |
| 2015/0270735 A1 | 9/2015 | Smith |
| 2015/0318745 A1 | 11/2015 | Matsuoka |
| 2015/0326166 A1 | 11/2015 | Hayashi |
| 2016/0045841 A1* | 2/2016 | Kaplan ................ C01B 32/05 429/49 |
| 2016/0065016 A1* | 3/2016 | Seufert ................ H02K 1/30 310/156.08 |
| 2016/0082858 A1 | 3/2016 | Yang et al. |
| 2016/0105092 A1 | 4/2016 | Takakura et al. |
| 2016/0107758 A1* | 4/2016 | Esteyne ............... B64D 27/24 318/139 |
| 2016/0141999 A1* | 5/2016 | Han ................. H02P 21/00 318/473 |
| 2016/0144725 A1 | 5/2016 | Nozawa |
| 2016/0176305 A1 | 6/2016 | James et al. |
| 2016/0258266 A1 | 9/2016 | Frick |
| 2017/0237383 A1* | 8/2017 | Buffenbarger ......... H02K 11/33 310/58 |
| 2017/0288286 A1 | 10/2017 | Buckhout et al. |
| 2018/0049314 A1 | 2/2018 | Amaducci et al. |
| 2018/0105059 A1 | 4/2018 | Namou et al. |
| 2018/0145623 A1 | 5/2018 | Xiang et al. |
| 2018/0236882 A1 | 8/2018 | Wang et al. |
| 2018/0294760 A1 | 10/2018 | Koenig et al. |
| 2018/0309349 A1 | 10/2018 | Sigmar |
| 2018/0323737 A1 | 11/2018 | Masillamani |
| 2018/0331540 A1 | 11/2018 | Mao et al. |
| 2018/0342933 A1 | 11/2018 | Tangudu et al. |
| 2019/0061654 A1 | 2/2019 | Tsuji et al. |
| 2019/0074625 A1 | 3/2019 | Rhys |
| 2019/0131851 A1 | 5/2019 | Herb |
| 2019/0202300 A1 | 7/2019 | Pastor et al. |
| 2020/0149427 A1* | 5/2020 | Long ................ B64D 27/02 |
| 2020/0381985 A1* | 12/2020 | Sercombe .............. H02P 29/60 |
| 2021/0366642 A1 | 11/2021 | Hermann et al. |

(56) References Cited

U.S. PATENT DOCUMENTS

FOREIGN PATENT DOCUMENTS

| | | | | |
|---|---|---|---|---|
| CN | 203463636 U | 3/2014 | | |
| CN | 104052221 A | 9/2014 | | |
| CN | 104057779 A | * 9/2014 | ............ | B60K 11/02 |
| CN | 203933369 U | 11/2014 | | |
| CN | 204517697 U | 7/2015 | | |
| CN | 102714081 B | 11/2015 | | |
| CN | 103795203 B | 4/2016 | | |
| CN | 106374701 A | 2/2017 | | |
| CN | 206211715 U | * 5/2017 | | |
| CN | 109921708 A | 6/2019 | | |
| CN | 209805612 U | 12/2019 | | |
| CN | 108429370 B | 5/2020 | | |
| CN | 108781023 B | 2/2021 | | |
| DE | 10240241 A1 | 3/2004 | | |
| DE | 102013208976 A1 | 4/2014 | | |
| DE | 102015201960 A1 | 8/2016 | | |
| DE | 102016200081 A1 | 7/2017 | | |
| DE | 102017213543 B4 | 8/2019 | | |
| DE | 102006037003 B4 | 3/2023 | | |
| EP | 0522015 B1 | 8/2000 | | |
| EP | 1453187 B1 | 9/2009 | | |
| EP | 1860756 B1 | 9/2012 | | |
| EP | 2592726 A2 | 5/2013 | | |
| EP | 2602515 A1 | * 6/2013 | ............ | F16H 57/042 |
| EP | 2774853 A1 | * 9/2014 | ............ | B64D 33/08 |
| EP | 102530219 U2 | * 9/2014 | ............ | B64D 33/08 |
| EP | 2799322 A1 | * 11/2014 | ............ | B60L 1/003 |
| FR | 3030383 A1 | 6/2016 | | |
| FR | 3036551 A1 | 11/2016 | | |
| FR | 3030383 B1 | 2/2017 | | |
| GB | 2503671 A | 1/2014 | | |
| JP | 2006-060952 A | 3/2006 | | |
| JP | 2010057290 A | 3/2010 | | |
| JP | 2017147878 A | 8/2017 | | |
| JP | 2018182927 A | 11/2018 | | |
| JP | 2019169499 A | 10/2019 | | |
| KR | 20140050885 A | 4/2014 | | |
| KR | 20150004259 A | 1/2015 | | |
| KR | 1020180042529 | 4/2018 | | |
| RU | 2015156857 A | 7/2017 | | |
| WO | 2013056083 A1 | 4/2013 | | |
| WO | 2015101870 A1 | 7/2015 | | |
| WO | WO-2018030343 A1 | * 2/2018 | ............ | H02K 5/20 |
| WO | 2018137955 A1 | 8/2018 | | |
| WO | 2018218314 A1 | 12/2018 | | |
| WO | 2019017495 A1 | 1/2019 | | |
| WO | 2019041915 A1 | 3/2019 | | |
| WO | 2019056095 A1 | 3/2019 | | |
| WO | WO-2020067259 A1 | * 4/2020 | ............ | H02K 9/19 |

OTHER PUBLICATIONS

Office Action dated Sep. 15, 2022 received in U.S. Appl. No. 16/888,824, 26 pages.
Combined Examination and Search Report Mailed Nov. 27, 2020 In GB2008171.7.
Office Action dated Apr. 28, 2022 received in U.S. Appl. No. 16/888,824, 20 pages.
United Kingdom Search Report dated Oct. 27, 2022 received in a corresponding foreign application, 4 pages.
Office Action dated Feb. 6, 2023 received in U.S. Appl. No. 16/888,824, 35 pages.
Office Action dated May 31, 2023 received in U.S. Appl. No. 16/888,824, 36 pages.
Search Report issued by the United Kingdom Patent Office dated Apr. 4, 2023 received in a related foreign application, 4 pages.
Combined Search and Examination Report issued by the United Kingdom Patent Office dated Sep. 18, 2023 received in a related foreign application, 4 pages.
Combined Search and Examination Report issued by the United Kingdom Patent Office dated Oct. 6, 2023 received in a corresponding foreign application, 7 pages.
Office Action dated Aug. 24, 2023 received in U.S. Appl. No. 16/888,824, 36 pages.
Search Report issued by the United Kingdom Patent Office dated Jun. 29, 2023 received in a related foreign application, 8 pages.
Office Action dated Jan. 3, 2024 received in U.S. Appl. No. 16/888,824, 37 pages.
Office Action dated May 28, 2024 received in U.S. Appl. No. 16/888,824, 38 Pages.
Combined Examination and Search Report mailed Jul. 5, 2022 in GB Application No. GB2202640.5, 9 pages.
Combined Examination and Search Report mailed Nov. 27, 2020 in GB Application No. GB2008178.2.
Search Report dated Oct. 21, 2022 issued by the United Kingdom Patent Office in a corresponding foreign application, GB2008178.2, 5 pages.
Office Action dated Dec. 16, 2024 received in U.S. Appl. No. 18/205,782, 21 pages.

* cited by examiner

ELECTRIC PROPULSION SYSTEM FOR DELIVERING HIGH TORQUE

BACKGROUND

This disclosure relates to systems to convert electrical energy or power to torque and in an embodiment to an electric propulsion system (EPS) that includes one or more electric motors or motor modules to generate torque and one or more motor controllers to supply power to the one or more motors or motor modules.

Traditionally, aircraft, for example airplanes, have used gas-powered engines to drive the propulsors to power the airplane. Gas powered engines for use in airplanes have certain hazards associated with transporting and utilizing the highly combustible fuel that is necessary to power the engines in those systems. Gas powered engines also have exhaust gases that are not environmentally friendly, and have performance characteristics that exhibit large variations at ambient conditions and with increasing altitude. It is desirable to have a power system to provide high-torque to propulsors for aircraft that is highly reliable and has redundancy, but does not have the disadvantages of gas powered engines, such as for example the hazards associated with a highly combustible fuel, the large performance variations and deteriorating performance at high altitudes, and environmentally unfriendly exhaust gases dispensed at high altitudes.

SUMMARY OF THE INVENTION

The summary of the disclosure is given to aid the understanding of an electric converter system that includes one or more electric motors and motor controllers, and their method of operation. The present disclosure is directed to a person of ordinary skill in the art. It should be understood that various aspects and features of the disclosure may advantageously be used separately in some instances, or in combination with other aspects and features of the disclosure in other instances.

In one or more embodiments, an electric converter system to convert electrical energy or power to torque is disclosed, where the system comprises one or more motor controllers, each motor controller adapted and configured to receive power controls and high-voltage, direct-current from battery power sources and convert the high-voltage, direct-current (DC) from the battery power sources to high-voltage, alternating-current (HVAC). The system further includes an electric motor assembly having a main shaft for supplying torque, the electric motor configured and adapted to receive power as high-voltage, alternating-current (AC) from the motor controller to rotate the main shaft to provide torque. The system in one or more embodiments receives control input and in response varies HVAC power to the one or more electric motors or motor modules to vary torque and speed output of the one or more electric motors or motor modules. In a representative application, the converter system has application as an electric propulsion system (EPS) that provides torque to and integrates with an aircraft propulsion system.

The system in an embodiment uses a liquid cooling system for the one or more motors or motor modules as well as for the one or more motor controllers and in an aspect uses the same fluid coolant, preferably a silicon or turbine oil, to flow, preferably serially, through both the motors and the motor controllers. In an aspect, the same coolant fluid flows parallel through the one or more motors and parallel through the one or more motor controllers, but serially through the motors and motor controllers.

BRIEF DESCRIPTION OF THE DRAWINGS

The various aspects, features, and embodiments of an electric converter system and its method of operation will be better understood when read in conjunction with the figures provided. Embodiments are provided in the figures for the purpose of illustrating aspects, features, and various embodiments of the electric conversion system including an electric motor controller, an electric motor, and an optional system controller, and their operation, but the disclosure should not be limited to the precise arrangement, structures, assemblies, subassemblies, systems, mechanisms, features, aspects, embodiments, methods, processes, devices, and/or uses shown, and the arrangement, structure, assembly, subassembly, system, mechanisms, features, aspects, embodiments, methods, processes, and devices shown may be used singularly or in combination with other arrangements, structures, assemblies, subassemblies, systems, mechanisms, features, aspects, embodiments, methods, processes, and/or devices, or for other uses.

DETAILED DESCRIPTION

Figure 1:
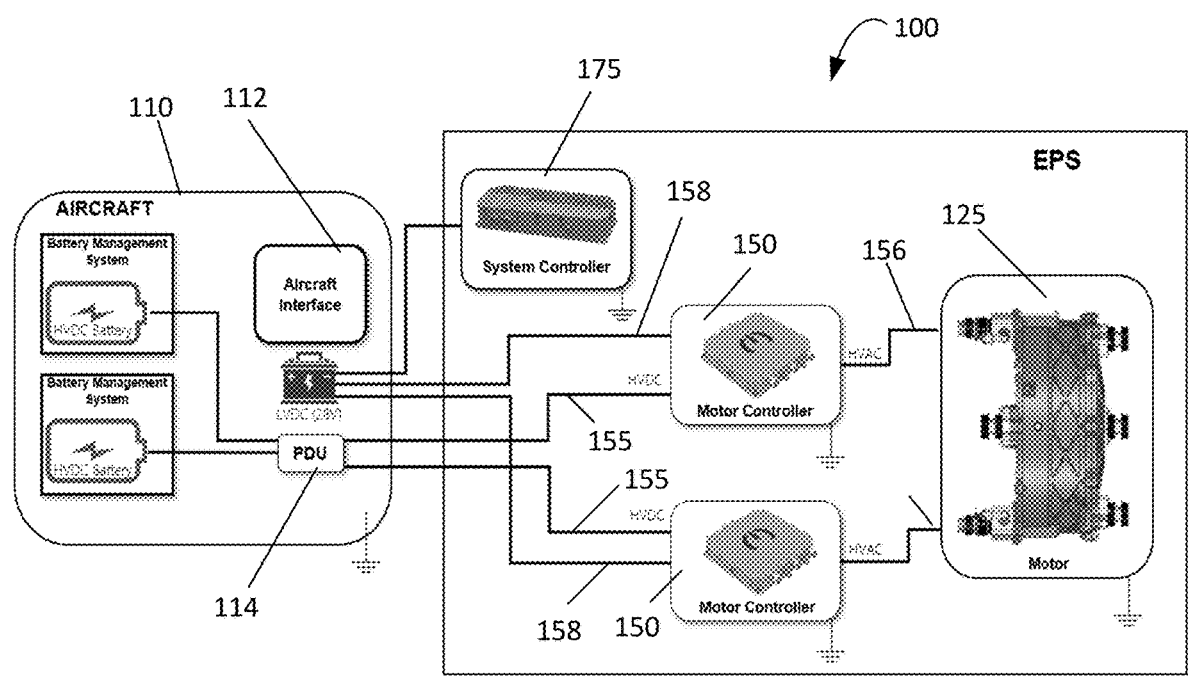
FIG. 1 shows a simplified block diagram of the electric power distribution in an embodiment of an electric propulsion system (EPS) that is adapted for use in powering a propulsor driven aircraft.

The following description is made for illustrating the general principles of the invention and is not meant to limit the inventive concepts claimed herein. In the following detailed description, numerous details are set forth in order to provide an understanding of an electric conversion system configured as an electric propulsion system (EPS), its architectural structure, components, subsystems, and methods of operation, particularly configured to power a propulsion driven aircraft, however, it will be understood by those skilled in the art that different and numerous embodiments of the electric converter system, its architectural structure, its components and subsystems, its methods of operation, and its uses may be practiced without those specific details, and the claims and invention should not be limited to the arrangements, structures, embodiments, assemblies, subassemblies, mechanisms, features, functional units, circuitry, processes, methods, aspects, features, details, or uses specifically described and shown herein. Further, particular features, aspects, functions, circuitry, mechanisms, details, and embodiments described herein can be used in combination with other described features, aspects, functions, circuitry, details, mechanisms, and/or embodiments in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified.

An multi-use electric converter system is disclosed that is configured as an electric propulsion system (EPS) 100 for use as the main propulsion system in an electric aircraft 110 as shown in the illustrative simplified block diagram of the embodiments of FIGS. 1-5. While the electric conversion system is described with reference as an EPS it should be appreciated that the electric conversion system is not so limited and has many uses and applications. The EPS 100 in one or more embodiments comprises an electric motor 125 that provides the mechanical output to the main propulsor or propulsors of the aircraft; and one or more motor controllers 150 that convert aircraft control inputs and electrical power from on-board energy sources, e.g., batteries, to the power, e.g., alternating-current (AC), required by the electric motor 125. The one or more motor controllers 150 receive control input and electrical power resulting in the delivery of power to the electric motor 125, and in response mechanical torque and power at the output of the main shaft 126 of the electric motor 125. An optional system controller 175 is included in EPS 100 that forms in an aspect an aircraft interface 112 between the aircraft systems 110 and the EPS 100, e.g., the motor controller 150. Other additional components may be included, and the EPS 100 is not limited to the arrangement or type of components illustrated in FIGS. 1-5.

FIG. 1 illustrates a block diagram of the electric power distribution, conversion and redundancy in the EPS 100. FIG. 1 shows the EPS 100 with two motor controllers 150, an electric motor 125, and an optional system controller 175. More or less motor controllers 150 and/or electric motors 125 are contemplated for the EPS 100. The electric motors discussed in this application can take many forms, and in one or more embodiments are constructed and configured as, and share features with, the electric motors described and taught in U.S. patent application Ser. No. 16/888,824, filed on May 31, 2020, the entirety of which is incorporated by reference herein. The motor controllers discussed in this application can take many forms, and in one or more embodiments are constructed and configured as, and share features with, the motor controllers described and taught in U.S. patent application Ser. No. 16/888,809 filed on May 31, 2020, the entirety of which is incorporated by reference herein.

FIG. 1 also shows the aircraft 110 and some of its on-board components, including the electric batteries, preferably high-voltage batteries and low-voltage batteries, and the battery management system. The aircraft systems and components 110 may further include a power distribution unit or PDU 114 that facilitates the distribution of power to the components of the EPS 100, including preferably the motor controllers 125 as shown in FIG. 1. The aircraft systems and components 110 in an embodiment further include an aircraft interface 112 to provide control inputs to the EPS 100.

In the embodiment of FIG. 1, high-voltage, direct-current (HVDC) 155, e.g., 400-800 volts, is supplied to the motor controllers 150, e.g., from PDU 114, and the motor controllers 150 convert the incoming HVDC 155 to high-voltage, alternating-current (HVAC) 156 that is supplied to the electric motor 125. The HVAC power 156 supplied to the electric motor 125 turns the motor shaft 126 which drives (rotates) the propulsor of the aircraft. Each motor controller 150 shown in FIGS. 1 and 3, in one or more embodiments, supplies multiphase HVAC 156, and in an aspect three-phase HVAC 156, to an electrical connection box 130 on electric motor 125 shown in FIG. 2.

Preferably each motor controller 150 is configured to supply high-power HVAC 156 of about 130 to about 160 kilowatts at a frequency of about 10 Hertz (Hz) to about 1000 Hz to its corresponding electrical connection box 130 on electric motor 125. Each motor controller 150 in an embodiment independently supplies multi-phase, preferably three-phase, high power HVAC 156 preferably to separate electrical connection boxes 130 (second electrical connection box not shown in FIG. 2) or at least to separate electrical winding in the electric motor 125. The electrical windings or stator windings in this application can take many forms, including the construction and configuration of, and share features with, the stator windings as described and taught in U.S. patent application Ser. No. 16/888,824, filed on May 31, 2020, the entirety of which is incorporated by reference. Should one of the motor controllers 150 fail, the electric motor 125 would still be supplied with power 156, e.g., HVAC power 156, and the electric motor 125 would remain operational and provide torque to the main shaft 126 and the propulsor element of the aircraft 110. In addition, should one of the separate electrical windings in the electric motor 125 fail, then the electric motor 125 would still remain operational by way of the remaining operational electrical (stator) windings in the electric motor 125.

The motor controllers 150, and optionally the system controller 175, also receives low-voltage, direct-current (DC), e.g., 12-50 Volts (V) DC, more preferably about 28 V DC. The LVDC can be supplied by an independent direct-current (DC) battery source separate from the electric motor power source 155, e.g., the high-voltage DC batteries. The motor controllers 150 or DC-DC step down converters (not shown) can also be utilized to convert the high-voltage, direct-current (HVDC) power source 155 to LVDC for use by the motor controllers 125, or for use by the system controller 175. The LVDC 158 supplied to the one or more motor controllers 150 in an aspect is used to supply low-voltage power to the circuits in the motor controller 150 to provide control and monitoring functions from inputs and feedback as will be discussed.

Figure 4:
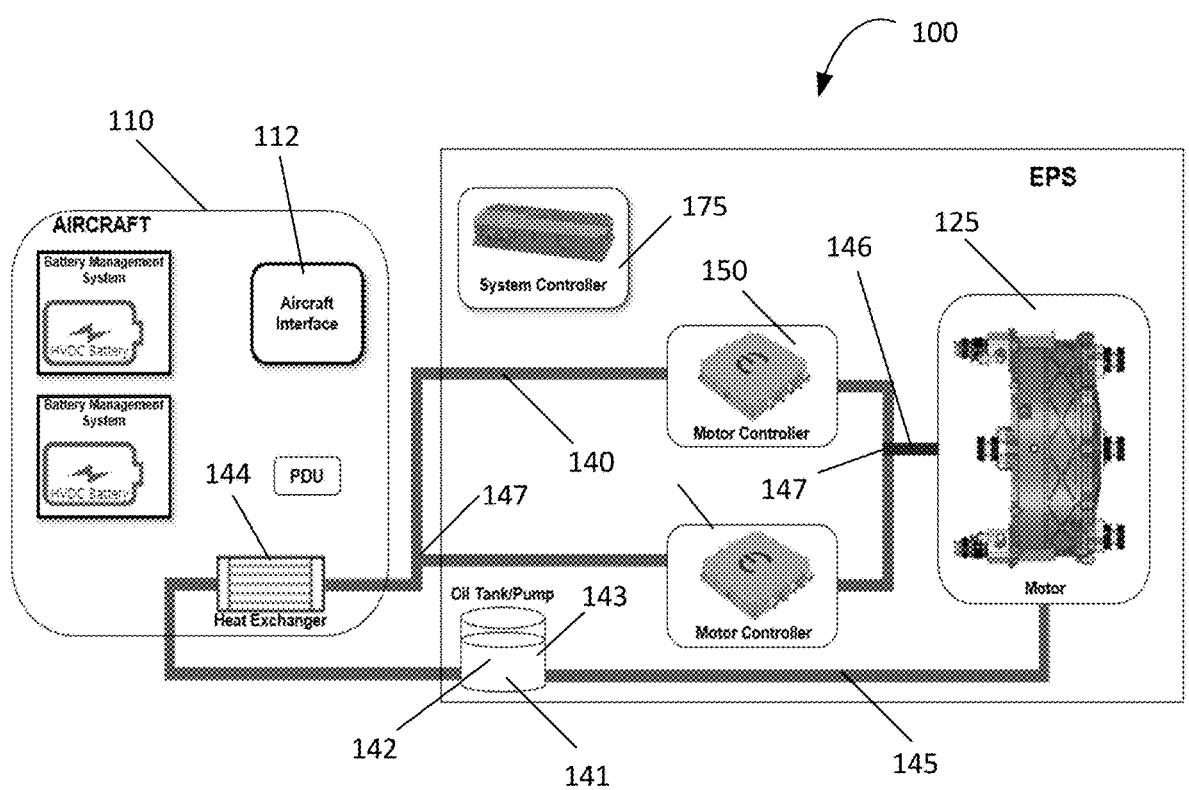
FIG. 4 shows a simplified block diagram of an embodiment of the cooling system of the EPS of FIG. 1.

FIG. 4 illustrates a block diagram of the cooling system 140 for EPS 100, including the systems and components in the EPS 100 and on-board the aircraft 110. FIG. 4 shows the EPS 100 with a cooling system 140 that in an embodiment includes a reservoir or tank 141 filled with fluid 142, e.g., silicon or turbine oil, and one or more pumps 143. More or less tanks 141 and/or pump systems 143 are contemplated for the EPS 100. For example, multiple tanks 141 can be used with one or more pumps 143. As illustrated in FIG. 4 the cooling system 140 includes a conduit, channel or pathway system 145 that directs fluid 142 to and through the electric motor 125 and preferably to and through at least one of the motor controllers 150, preferably all motor controllers 150, and returns to the reservoir or tank 141. One or more pumps 143 may be distributed throughout the conduit system 145. Cooling system 140, in an embodiment, includes one or more heat exchangers 144, which can be associated with the aircraft 110 as shown in FIG. 4. In one or more embodiments, the one or more pumps 143 can be electrically driven or mechanically driven by the electric motor 125, and in an embodiment can be driven by an accessory gearbox integrated with the electric motor 125, and in an aspect powered by the main shaft of the electric motor.

In one or more embodiments, as illustrated in FIG. 4, conduit system 146 extends between the one or more motor controllers 150 and the electric motor 125 so the same fluid 142 flows through both the electric motor 125 and the motor controllers 150. The cooling system 140 can include one or more splitters 147 for separating the conduit system 145 and rejoining the conduit system 145 as shown. The electric motor 125 can include cooling inlets connected to channels 145 to direct the fluid 142 to flow through the stator windings in the electric motor 125 preferably as described and taught in PCT/AU2018/050553 (WO 2018/218314), the entirety of which is incorporated by reference. Each cooling inlet, outlet, and connecting cooling channel inside electric motor 125 can form an independent cooling path through the electric motor 125, or multiple inlets and outlets can connect and communicate with a common channel though the electric motor 125. Each motor controller 150 preferably also includes one or more inlets to an internal channel to direct fluid 142 to flow into and through the housing of the motor controller 150 to cool the circuits and components inside the motor controller housing, particularly the high-voltage, high-power circuits. Preferably the cooling channel inside the motor controller 150 is formed with no seals so that the fluid 142 cannot leak into the compartment of the motor controller 150 where the circuitry is contained as described and taught in U.S. patent application Ser. No. 16/888,809 filed on May 31, 2020, the entirety of which is incorporated by reference. In an alternative embodiment, multiple independent cooling systems 140 can also be included so that a cooling system used for electric motors 125 is separate from the cooling system used for the motor controllers 150, and in a further embodiment each electric motor 125 can have a separate cooling system, and each motor controller 150 can have a separate cooling system.

In one or more embodiments, the same fluid 142 that is used to cool the electric motor and motor controller 150 is further optionally used (a) as the hydraulic working fluid in a governor interface system used to adjust the pitch of the propeller blade; (b) as lubricant fed into the governor interface system to lubricate one or more moving parts in the governor interface system; (c) as lubricant fed into the electric motor 125 to lubricate one or more moving parts in the electric motor; and (d) as further lubricant in an accessory gearbox integrated with the electric motor 125 and configured to drive accessories.

Figure 5:
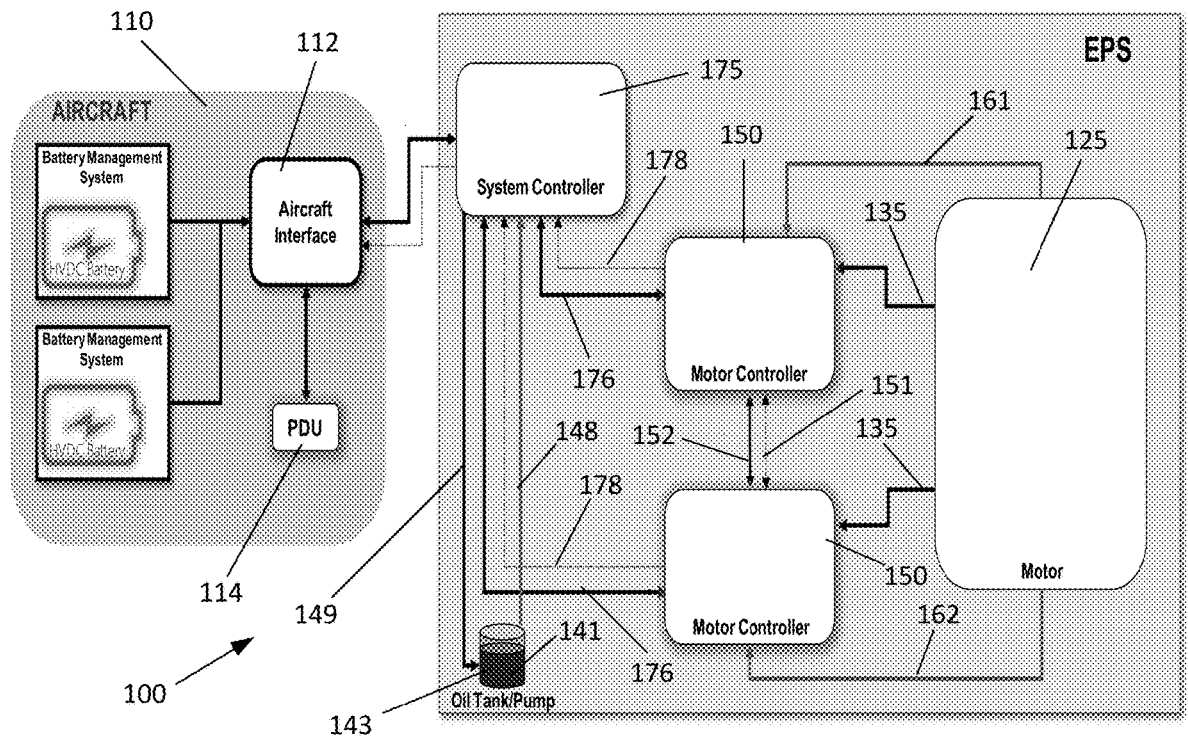
FIG. 5 shows a simplified block diagram of an embodiment of a communication and feedback network in the EPS of FIG. 1.

FIG. 5 illustrates a block diagram of the various communications, sensors, and feedback systems that can be employed in the EPS 100, and/or between the aircraft 110 and the EPS 100. For example, temperature sensors are included in one or more of the motor controllers 150 and/or electric motor(s) 125. Temperature data from the temperature sensors is communicated via line 161, 162 between the motor controllers 150 and/or the electric motor(s) 125, and in an aspect temperature data from the electric motor 125 can be communicated via input 161, 162 to the one or more motor controllers 150. Temperature data in an aspect is communicated from the electric motor separately to each motor controller 150. The temperature data is processed by the motor controller 150 and is used to provide information and alerts to the aircraft displays and crew notification interfaces on the operating state and health of the components of EPS 100. In one or more embodiments, the electric motor 125 also communicates with the motor controllers 150 via communication lines 135, preferably electric motor 125 communicates to each motor controller 150 via communication lines 135. In one or more embodiments the electric motor 125 can communicate main shaft 126 revolutions per minute (RPM), the angular position of the main shaft 126 through an angular position sensor such as a variable reluctance resolver, optical encoder, or a set of hall-effect sensors, and/or other data to the motor controllers 150 via communication and data lines 135, preferably separately to each motor controller 150. The motor controllers 150 in an aspect process and monitors the data from the electric motor 125 to determine whether to adjust the speed and/or torque of the electric motor 125. The one or more motor controllers 150 in an embodiment communicate with each other and exchange data via communication line 152, and optionally also include a discrete input/output line 151 between the two motor controllers 150. The discrete inputs and outputs use high and low voltage states as a direct communication mechanism for important system states. For example, a discrete input can be pulled high to indicate the aircraft is ready for the motor controller 150 to apply power to the electric motor 125, or to indicate that an aircraft 110 or system 100 fault state that requires the motor controller 150 to immediately shut down. Discrete outputs from the motor controller 150 in an example are typically used to indicate that the system requires HVDC voltage to be removed or opened (via switches located in the PDU) due to an error or fault detected by the motor controller 150. By having two motor controllers 150 communicate with each other, data and feedback from sensors within the EPS system 100 can be checked. In addition, having two motor controllers 150 provides a redundancy where if one motor controller 150 fails, the EPS system 100 can remain operational.

As shown in FIG. 5, where optional system controller 175 is included in the EPS 100, the system controller 175 according to one or more aspects can communicate with the one or more motor controllers 150 via communication line 176, and preferably communicates to each motor control 150 separately via communication and data line 176. In addition, in an embodiment the cooling system pump 143 and/or tank 141 optionally communicates temperature and/or pressure to the system controller 175 via communication and data line 148. The system controller 175 in an embodiment also sends control signals 149 to the cooling system tank 141 and/or pump 143 to control and regulate the pressure in the cooling system 140. The system controller 175 receives from the motor controllers 150, preferably independently via communication line 178 from each motor controller 150, discrete output. The discrete output received is in the form of a high/low signal indicating the operating state of the motor controller 150. In an aspect, the aircraft interface 112 and system controller 175 communicate with each other via communication and data line 190. The aircraft interface 112 provides control information to control and regulate the EPS 100. The system controller 175 can also have a discrete output 191 that communicates to the aircraft interface 112 via communication and data line 191. In an embodiment, the battery management system and/or PDU can communicate with the aircraft interface 112, and in a further aspect, the aircraft interface 112 can communicate and control the PDU 114.

An electric propulsion system (EPS) 200 for use as the main propulsion system in an aircraft 210 is disclosed, as shown in the illustrative simplified block diagram of the embodiments of FIGS. 6-9. The EPS 200 in one or more embodiments comprises an electric motor 225 that provides the mechanical output to the main propulsor or propulsors of the aircraft 210, and one or more motor controllers 250 that convert aircraft inputs and electrical power from on-board energy sources, e.g., batteries, to the power, e.g., alternating-current (AC), required by the electric motor 225. The one or more motor controllers 250 receive control input and electrical power resulting in the delivery of power to the electric motor 225, and in response mechanical torque at the output of the main shaft 226 of the electric motor 225. Optionally, one or more system controllers 275 are included in EPS 200 that form in an aspect an interface between the aircraft systems 210 and the EPS 200. In the example EPS 200 of FIGS. 6-9, there are shown an electric motor 225, four motor controllers 250, and two system controllers 275, however, it should be understood that more or less electric motors 225, motor controllers 250, and/or optional system controllers 275 are contemplated for use in EPS 200. Other additional components may be included, and the EPS 200 is not limited to the arrangement or type of components illustrated in FIGS. 6-9.

Figure 6:
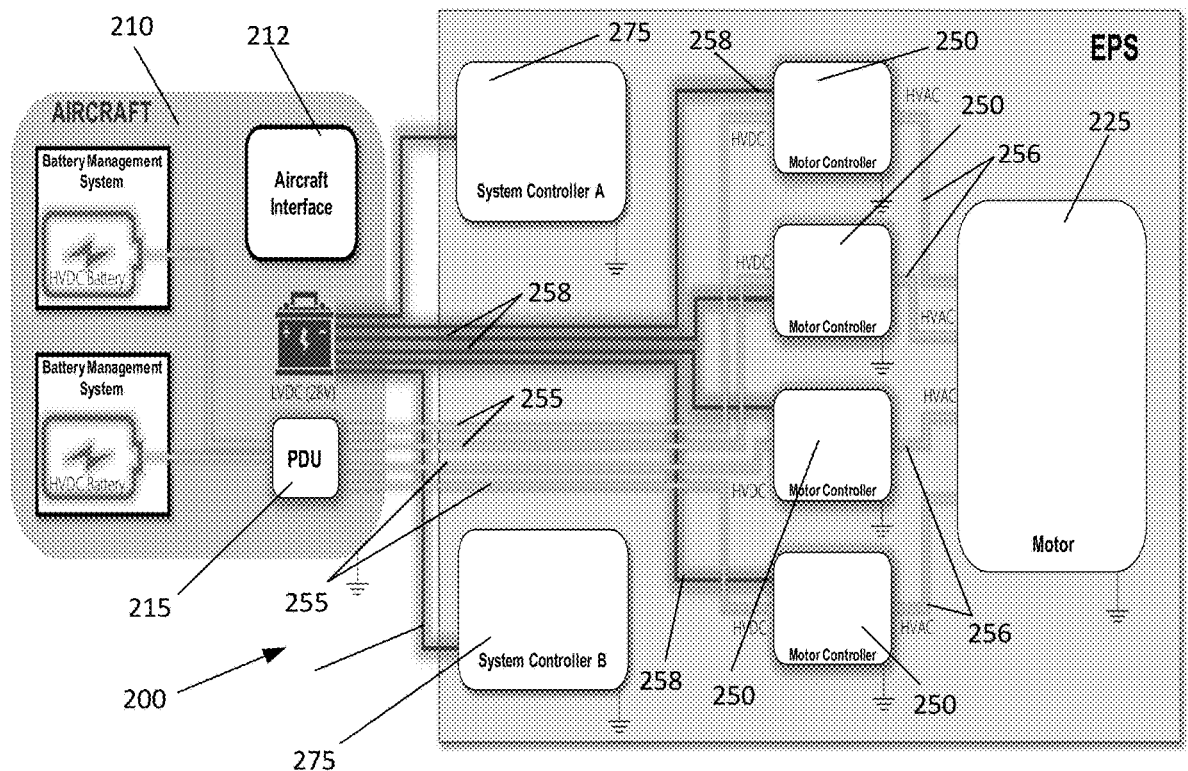
FIG. 6 shows a simplified block diagram of a further example of the electric power distribution in an embodiment of an EPS that is adapted for use in powering a propulsor driven aircraft.
Figure 7:
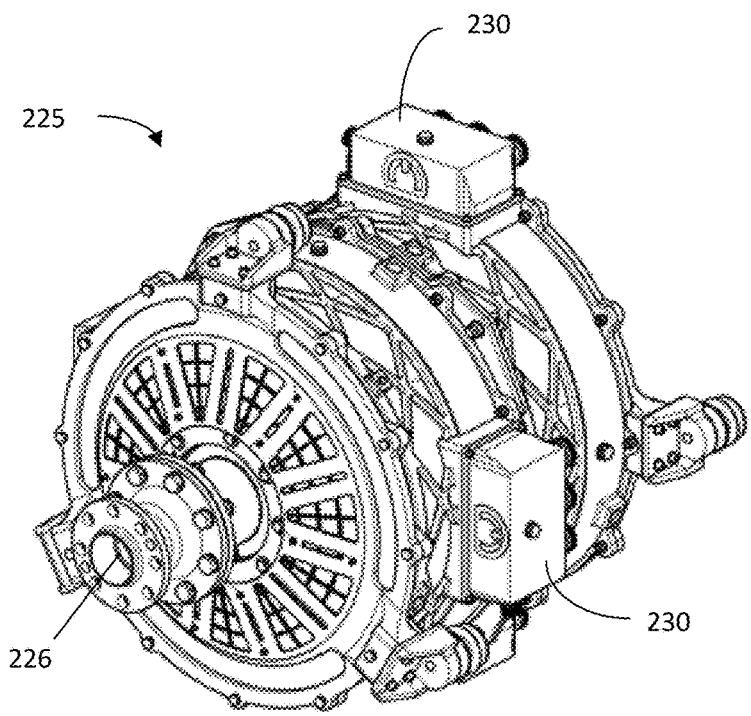
FIG. 7 illustrates a front perspective view of an example of an embodiment of an electric motor for use in the EPS of FIG. 6.

FIG. 6 illustrates a block diagram of the electric power distribution, conversion, and redundancy in EPS 200. In the embodiment of FIG. 6, high-voltage, direct-current (HVDC) 255, e.g., 400-800 volts, is supplied to the motor controllers 250, e.g., from PDU 214, and the motor controllers 250 convert the incoming HVDC 255 to high-voltage alternating-current (HVAC) 256 that is supplied to the electric motor 200. The HVAC power 256 supplied to the electric motor 225 turns the motor shaft 126 which drives (rotates) the propulsor of the aircraft. Each motor controller 150 shown in FIG. 3, in one or more embodiments, supplies multiphase HVAC 256, and in an aspect three-phase HVAC 256, to an electrical connection box 230 on electric motor 225 shown in FIG. 7 (only two electrical boxes 230 shown in FIG. 7 as others are hidden from view). Preferably each motor controller 250 is configured to supply high-power HVAC 256 of about 130 to about 160 kilowatts at a frequency of about 10 Hertz (Hz) to about 1000 Hz to its corresponding electrical connection box 230 on electric motor 225.

Each motor controller 250 independently supplies multiphase, preferably three-phase, high power HVAC 256 to separate electrical connection boxes 230 or at least to separate electrical winding in the electric motor 225. In this manner electric motor 225 receives four independent power sources 256 of multiphase alternating current, preferably four independent power sources 256 of three phases of HVAC. Should one of the motor controllers 250 fail, the electric motor 225 would still be supplied with power 256, e.g., multiphase HVAC power 256, from the remaining three motor controllers 250, and the electric motor 225 would remain operational and provide torque to the main shaft 226 and the propulsor element of the aircraft 210. In addition, should one of the separate electrical windings in the electric motor 225 fail, then the electric motor 225 would still remain operational by way of the remaining three operational electrical (stator) windings in the electric motor 225.

As shown in FIG. 6, low-voltage, direct-current (LVDC) power 257, e.g., 12-50 Volts (V) DC, more preferably about 28 V DC, is supplied to the motor controllers 250, and the optional system controllers 275. Additionally, or alternatively, the system controller 275 could be supplied with low voltage, direct-current, e.g., 12-50 volts, from the motor controllers 250 (not shown) or from DC-DC step down converters (not shown) that convert the high-voltage, direct-current (HVDC) power source 255 to LVDC. The LVDC 258 supplied to the one or more motor controllers 250 in an aspect is used to supply low-voltage to circuits in the motor controller 250 to provide electric motor control and monitoring functions from sensor and data inputs.

Figure 8:
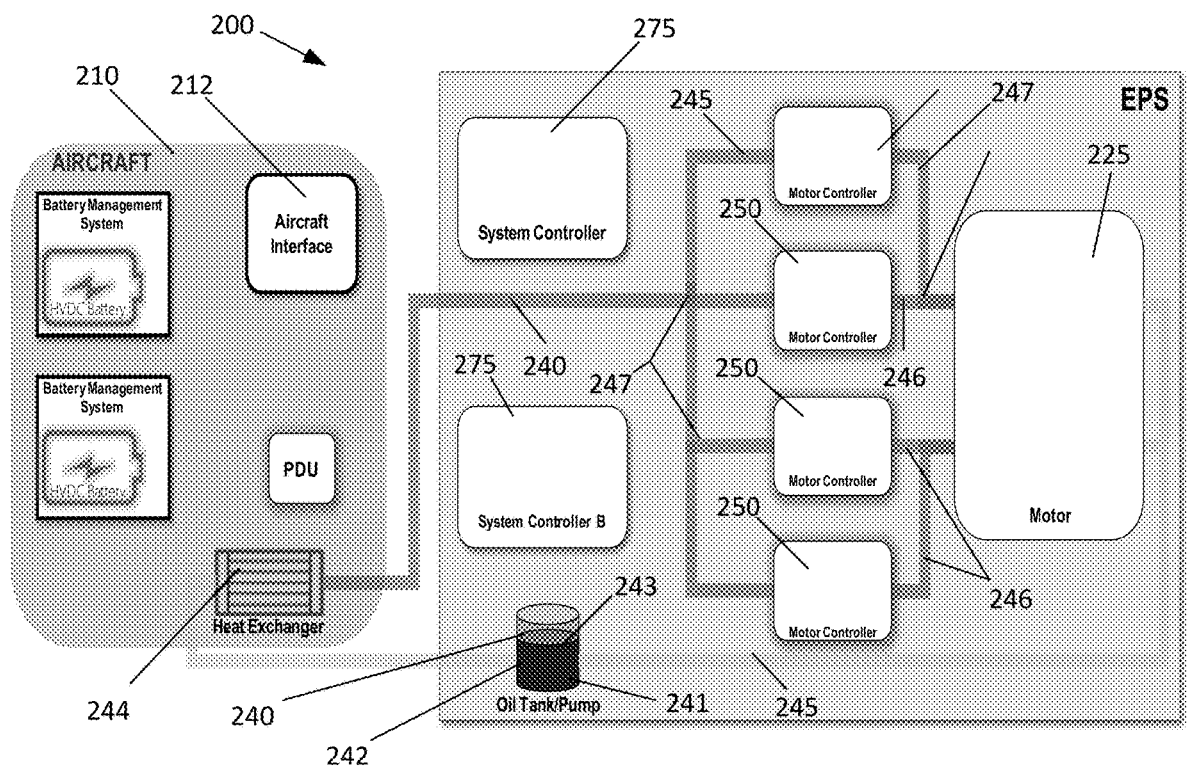
FIG. 8 shows a simplified block diagram of an embodiment of the cooling system of the EPS of FIG. 6.

FIG. 8 illustrates a block diagram of the cooling system 240 for EPS 200, including the systems and components in the EPS 200 and on-board the aircraft 210. FIG. 8 shows the EPS 200 with cooling system 240 that in an embodiment includes a reservoir or tank 241 filled with fluid 242, e.g., silicon or turbine oil, and one or more pumps 243. More or less tanks 241 and/or pump systems 243 are contemplated for the EPS 200. For example, multiple tanks 241 can be used with one or more pumps 243. Cooling system 240 preferably also includes one or more heat exchangers 244. As illustrated in FIG. 8, the cooling system 240 includes a conduit, channel, or pathway system 245 for cooling fluid 242 to flow to and through the electric motor 225 and preferably to and through at least one of the motor controllers 250, preferably all the motor controllers 250, and returns to the reservoir or tank 241. One or more pumps 243 may be distributed throughout the conduit 245. The EPS 200 has a common cooling system 240 that is shared by the motor controllers 250 and the electric motor 225. In one or more embodiments, the one or more pumps 243 can be electrically driven or mechanically driven by the electric motor 225, and in an embodiment can be driven by an accessory gearbox integrated with the electric motor 225, and in an aspect the accessory gearbox is powered by the main shaft of the electric motor 225.

In one or more embodiments, as illustrated in FIG. 8, conduit system 246 extends between and through the one or more motor controllers 250 and through the electric motor 225 so the same fluid 242 flows through both the electric motor 225 and the motor controllers 250. The cooling system 240 can include one or more splitters 247 for separating the conduit system 245 and rejoining the conduit system 245. In this regard, in FIG. 8, two separate parallel paths or channels of fluid flow is provided through the electric motor 225, and the fluid 242 flows through separate parallel channels through the motor controllers 250. The electric motor 225 can include cooling inlets connected to channels 245 to direct the fluid 242 to flow through the stator windings in the electric motor 225. Each cooling inlet, outlet, and connecting cooling channel inside the electric motor 225 can form an independent cooling path through the electric motor 225, or multiple inlets and outlets can connect and communicate with a common channel though the electric motor 225.

Each motor controller 250 preferably also includes one or more inlets to an internal channel to direct fluid 242 to flow into and through the housing of the motor controller 250 to cool the circuits and components inside the motor controller housing, particularly the high-voltage, high-power circuits. Preferably the cooling channel inside the motor controller 250 is formed with no seals so that fluid 242 cannot leak into the compartment of the motor controller 250. In an alternative embodiment, multiple independent cooling systems 240 can also be included so that a cooling system used for electric motor 225 is separate from the cooling system used for the motor controllers 250, and in a further embodiment each electric motor 225 can have a separate cooling system, and each motor controller 250 can have a separate cooling system.

In one or more embodiments, the same fluid 242 that is used to cool the electric motor and motor controller 250 is further optionally used (a) as the hydraulic working fluid in a governor interface system used to adjust the pitch of the propeller blade; (b) as lubricant fed into the governor interface system to lubricate one or more moving parts in the governor interface system; (c) as lubricant fed into the electric motor 225 to lubricate one or more moving parts in the electric motor; and (d) as further lubricant in an accessory gearbox integrated with the electric motor 225 and configured to drive accessories.

Figure 9:
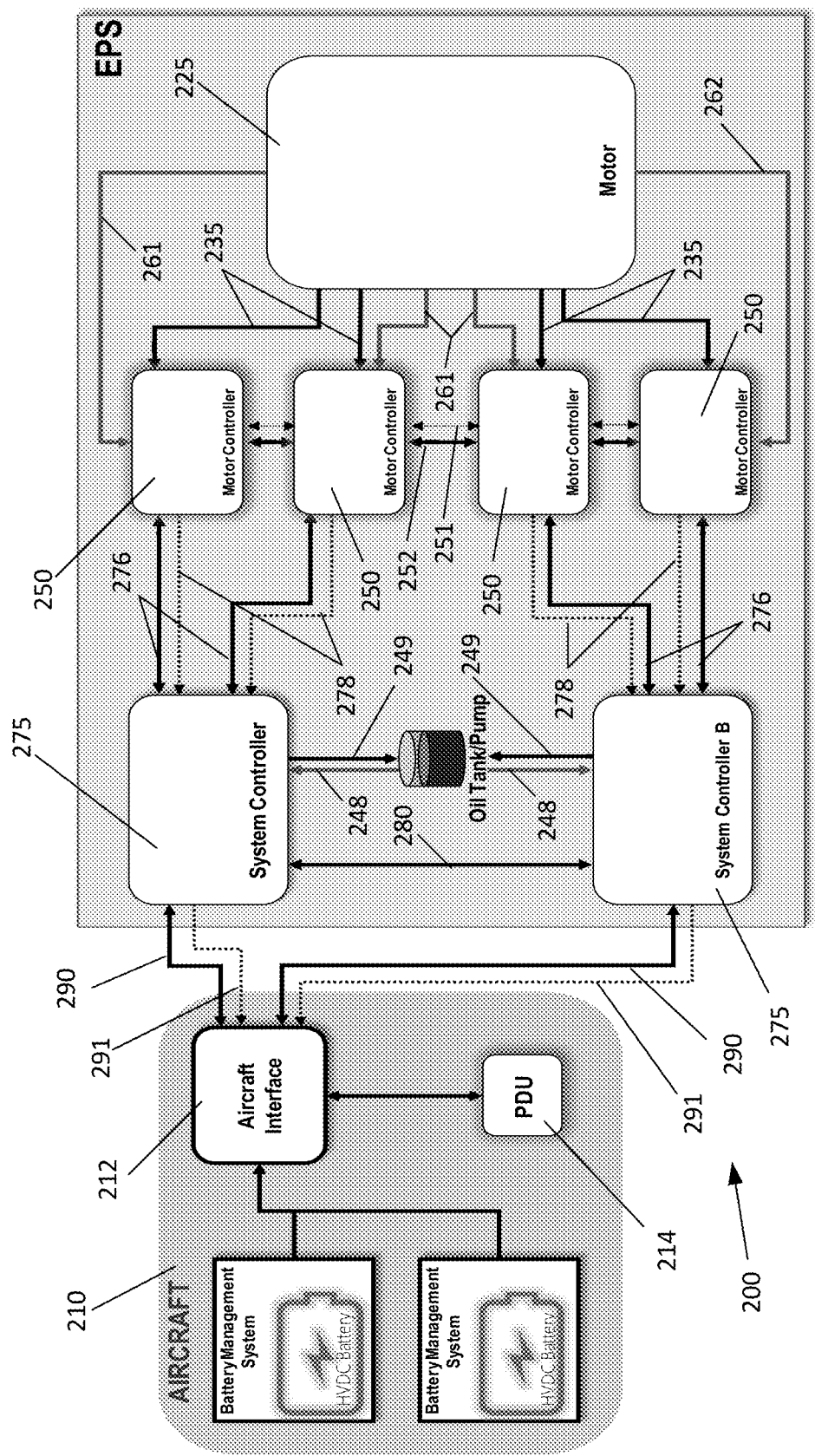
FIG. 9 shows a simplified block diagram of an embodiment of a communication and feedback network in the EPS of FIG. 6.

FIG. 9 illustrates a block diagram of the various communications, sensors, and feedback systems that can be used in the EPS 200, and/or between the aircraft 210 and the EPS 200. For example, temperature sensors are included in one or more of the motor controllers 250 and/or electric motor(s) 225. Temperature data from the temperature sensors is communicated via line 261, 262 between the motor controllers 250 and/or the electric motor(s) 225, particularly temperature data from the electric motor 225 is communicated to the one or more motor controllers 250. Temperature data in an aspect is communicated from the electric motor 225 separately to each motor controller 250. The temperature data is processed by the motor controller 250 and is used to provide information and alerts to the aircraft displays and crew notification interfaces on the operating state and health of the components of the EPS 200. In one or more embodiments, the electric motor 225 also communicates with the motor controllers 250 via communication lines 235, preferably the electric motor 225 communicates to each motor controller 150 via communication lines 235. In one or more embodiments the electric motor 225 can communicate main shaft 226 revolutions per minute (RPM), the angular position of the main shaft 226 through a resolver sensor, and/or other data to the motor controllers 250 via communication and data lines 235, preferably separately to each motor controller 250. The motor controllers 250 in an aspect process and monitor the data from the electric motor 225 to determine whether to adjust the speed and/or torque of the electric motor 225. The one or more motor controllers 225 in an embodiment communicate with each other and exchange data via communication line 252, and optionally also include a discrete input/output line 251 between the two motor controllers 250. The discrete inputs and outputs use high and low voltage states as a direct communication mechanism for important system states. For example, a discrete input can be pulled high to indicate the aircraft is ready for the motor controller 250 to apply power to the electric motor 225, or to indicate that an aircraft 210 or system 200 fault state that requires the motor controller 250 to immediately shut down. Discrete outputs from the motor controller 250 in an example are typically used to indicate that the system requires HVDC voltage to be removed or opened (via switches located in the PDU) due to an error or fault detected by the motor controller 250.

As shown in FIG. 9, where optional system controllers 275 are included in the EPS 200, the system controllers 275 according to one or more aspects can communicate with the one or more motor controllers 250 via communication lines 276, and preferably each system controller 275 communicates to two motor controllers 250 separately via communication and data lines 276. In addition, in an embodiment, the cooling system pump 243 and/or tank 241 optionally communicates temperature and/or pressure from the cooling system 240 to the system controllers 275 via communication and data lines 248. Each system controller 275 in an embodiment also sends separate control signals via communication lines 249 to the cooling system tank 241 and/or pump 243 to control and regulate the pressure in the cooling system 240. Each system controller 275 receives from two of the motor controllers 250, preferably independently via communication lines 278 from each motor controller 250, discrete output. These discrete outputs are in the form of a high/low signal indicating the operating state of the motor controller 250. The system controllers 250 communicate with each other via communication lines 280. Should one of the system controllers 275 have a fault or otherwise become inoperable the other system controller 275 can handle the control functions of the faulty system controller 275. In an aspect, the aircraft interface 212 and system controllers 275 communication with each other via communication and data lines 290. The aircraft interface 212 provides control information to control and regulate the EPS 200. The system controllers 275 can also have a discrete output that communicates to the aircraft interface via communication and data lines 291. The discrete output is in the form of a high/low signal indicating the operating state of the system controller 275. These discrete outputs can form part of a safety loop where system components that have fault monitoring functions (system controllers 275, motor controllers 250, battery management systems, smart PDUs) can provide a high or low signal or trigger safety actions, such as for example the removal of HVDC and shutdown of components of EPS 200, or other systems. In an embodiment, the battery management system and/or PDU 214 can communicate with the aircraft interface 212, and in a further aspect, the aircraft interface 212 can communicate and control the PDU 214.

Figure 10:
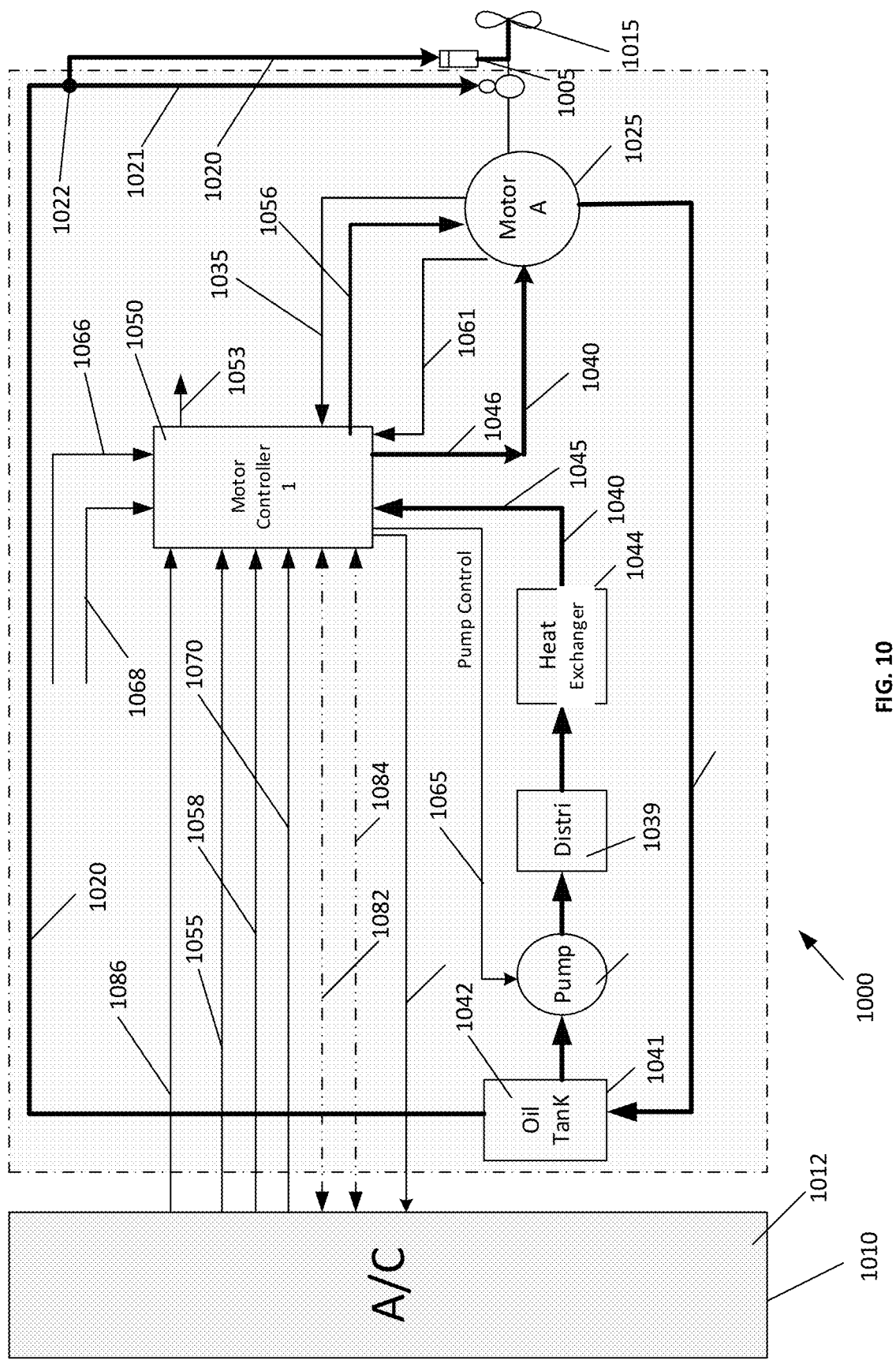
FIG. 10 shows a simplified block diagram of a further embodiment of an EPS that is adapted for powering a propulsor driven aircraft.

An embodiment of electric propulsion system (EPS) 1000 for use as the main propulsion system in an electric aircraft 1010 is disclosed as shown in the illustrative simplified block diagram of FIG. 10. The EPS 1000 in one or more embodiments comprises an electric motor 1025 that provides the mechanical output to the main propulsor or propulsors 1015 of the aircraft 1010, and one or more motor controllers 1050 that convert aircraft control inputs and electrical power from on-board resources, e.g., batteries, to the power, e.g., alternating-current (AC), required by the electric motor 1025. In the embodiment of FIG. 10 the motor controller 1050 forms an interface between the aircraft systems 1010 and the EPS 1000. The motor controller 1050 receives the power commands from the cockpit and provides various control functions in the EPS system 1000 including supplying power to the electric motor 1025 to provide mechanical torque at the output of the main shaft 1026 of the electric motor 1025. Other additional components may be included, and the EPS 1000 is not limited to the arrangement or type of components illustrated in FIG. 10.

FIG. 10 illustrates a block diagram of the electric power distribution, conversion and redundancy in the EPS 1000. EPS 1000 has a single motor controller 1050 and an electric motor 1025. More or less motor controllers 1050, and/or electric motors 1025 are contemplated for EPS 1000, as illustrated by EPS 1100 in FIG. 11. FIG. 10 also diagrammatically illustrates the aircraft (A/C) 1010 which typically includes on-board components, including the electric batteries, preferably high-voltage batteries and low-voltage batteries, and for example the battery management system, and optional power distribution unit or PDU that facilitates the distribution of power to the components of the EPS 1000, and an aircraft interface 1012 to provide control inputs to the EPS 1000. In the embodiment of FIG. 10, high-voltage, direct-current (HVDC) 1055, e.g., 400-800 volts, is supplied to the motor controller 1050 from the aircraft 1010, and the motor controller 1050 converts the incoming HVDC 1055 to high-voltage, alternating-current (HVAC) 1056 that is supplied to the electric motor 1025. The HVAC power 1056 supplied to the electric motor 1025 turns the motor shaft 1026 which drives (rotates) the propulsor 1015 of the aircraft 1010.

Figure 2:
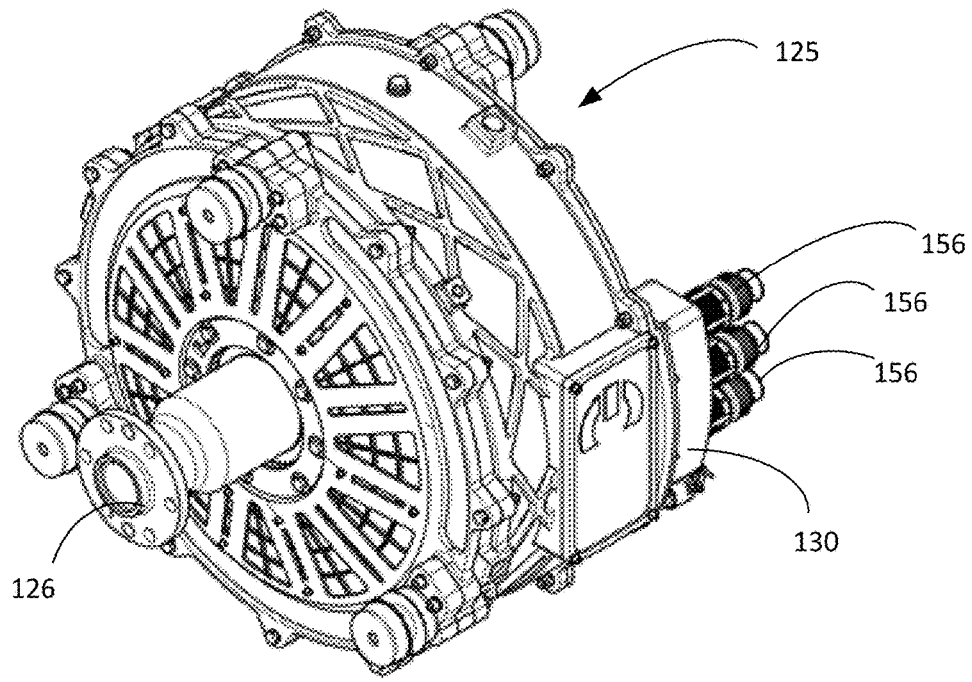
FIG. 2 shows an embodiment of an electric motor for use in the EPS system of FIG. 1.
Figure 3:
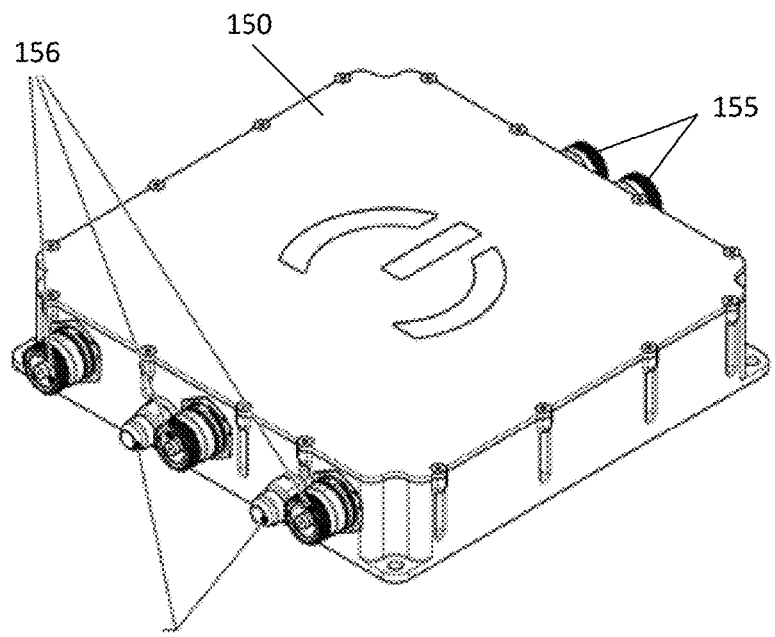
FIG. 3 shows an example motor controller for supplying power to an electric motor, e.g., electric motor of FIG. 2.

The motor controller 1050 shown in FIG. 10, in one or more embodiments, supplies multiphase HVAC 1056, and in an aspect three-phase HVAC 1056, to one or more electrical connection boxes 1030 on electric motor 1025 shown, for example, in FIG. 2. Preferably the motor controller 1050 is configured to supply high-power HVAC 1056 of about 130 to about 160 kilowatts at a frequency of about 10 Hertz (Hz) to about 1000 Hz to each of two electrical connection boxes 1030 on electric motor 1025. Preferably motor controller 1050 is a double unit that supplies dual, three-phase HVAC to the electric motor 1025. That is, motor controller 1050 supplies six (6) phases of HVAC to electric motor 1025, where in an embodiment there are two corresponding and independent 3-phases of HVAC being supplied to the electric motor 1025 preferably to supply electric power to two separate and independent windings in the electric motor 1025. The phases of the two independent 3-phase HVAC power inputs to the electric motor 1025 supplied by the motor controller 1050 are in one or more embodiments timed to be the same, or substantially the same.

The EPS 1000 of FIG. 10 supplies dual multi-phase, preferably dual three-phase, high power HVAC 1056 of about 130 to about 160 kilowatts to electric motor 1025 preferably to two separate electrical connection boxes 1030 (second electrical connection box not shown in FIG. 2) or at least to separate electrical winding in the electric motor 1025. Should one side of the HVAC 3-phase power of the motor controller 1050 fail, the electric motor 1025 would still be supplied with power 1056, e.g., HVAC power 1056, and the electric motor 1025 would remain operational and provide torque to the main shaft 1026 and the propulsor element 1015 of the aircraft 1010. In addition, should one of the separate electrical windings in the electric motor 1025 fail, then the electric motor 1025 would still remain operational by way of the remaining operational electrical (stator) windings in the electric motor 1025.

The EPS 1000 also preferably is supplied with low-voltage, direct-current (DC), e.g., 12-50 Volts (V) DC, more preferably about 28 V DC. As shown in FIG. 10, low-voltage, direct-current (LVDC) power 1058 is supplied to the motor controllers 1050. Additionally, or alternatively, the motor controller 1050 could convert the high-voltage, direct-current (HVDC) power source 1055 to LVDC. The LVDC 1058 supplied to the one or more motor controllers 1050 in an aspect is used to supply low-voltage to circuits in the motor controller 1050 to provide control and monitoring functions in the EPS 1000.

FIG. 10 also illustrates a block diagram of the cooling system 1040 for EPS 1000, including the systems and components in the EPS 1000. The cooling system 1040 in an embodiment includes a reservoir or tank 1041 filled with fluid 1042, e.g., silicon or turbine oil, one or more pumps 1043, one or more heat exchangers 1044, and a distribution unit 1039. More or less tanks 1041, pump systems 143, and/or heat exchangers 1044 are contemplated for the EPS 1000. For example, multiple tanks 1041 can be used with one or more pumps 1043. As illustrated in FIG. 10, the cooling system 1040 includes conduit, channel, or pathway system 1045 that directs cooling fluid 1042 to and through the electric motor controller 1050 and preferably through electric motor 1025, and to return to the reservoir or tank 1041. One or more pumps 1043 may be distributed throughout the conduit system 1045. In one or more embodiments, the one or more pumps 1043 can be electrically driven or mechanically driven by the electric motor 1025, and in an embodiment can be driven by an accessory gearbox integrated with the electric motor 1025, and in an aspect the accessory gearbox is powered by the main shaft of the electric motor.

In one or more embodiments, as illustrated in FIG. 10, conduit 1046 extends between the motor controller 1050 and the electric motor 1025 so the same fluid 1042 flows through both the electric engine 1025 and the motor controller 1050. The electric motor 1025 can include one or more cooling inlets connected to channels 1045 to direct the fluid 1042 to flow through the stator windings in the electric motor 1025 preferably as described and taught in PCT/AU2018/050553 (WO 2018/218314), the entirety of which is incorporated by reference. Each cooling inlet, outlet, and connecting cooling channel inside the electric motor 1025 can form an independent cooling path through the electric motor 1025, or multiple inlets and outlets can connect and communicate with a common channel though the electric motor 1025. Each motor controller 1050 preferably also includes one or more inlets to an internal channel to direct cooling fluid 1042 to flow into and through the housing of the motor controller 1050 to cool the circuits and components inside the motor controller housing, particularly the high-voltage, high-power circuits. Preferably the cooling channel inside the motor controller 1050 is formed with no seals so that fluid 1042 cannot leak into the compartment of the motor controller 1050 where the circuitry is contained. In an alternative embodiment, multiple independent cooling systems 1040 can also be included so that a cooling system used for electric motor 1025 is separate from the cooling system used for the motor controller 1050, and in a further embodiment each electric motor 1025 can have a separate cooling system, and each motor controller can have a separate cooling system.

In an embodiment, the electric motor 1025 includes an accessory gearbox that incorporates a governor interface integrated system 1005 optionally attached to the main shaft of the electric motor 1025 to provide hydraulic fluid to the propulsor 1012 to adjust the pitch of the propulsor 1012 (e.g., the propeller blades), provide a speed reference from the main shaft of the electric motor to the governor, and regulate the speed of the main shaft of the electric motor 1025. The governor interface integrated system 1005 can be mounted at the front or rear of the electric motor 1025, and in an embodiment governor interface integrated system 1005 uses as the hydraulic fluid used to adjust the pitch of the propulsor 1015 the same fluid 1042 as used to cool the EPS 1000. EPS system 1000 delivers fluid 1042 used in cooling system 1040 to electric motor 1025 through conduit or channel 1020 for use with governor interface integrated system 1005 integrated with motor 1025. The fluid 1042 delivered to the governor interface integrated system 1005 is used to adjust the pitch of the propulsor 1015, e.g., propeller 1015, as described and taught in U.S. patent application Ser. No. 16/888,824, filed on May 31, 2020, the entirety of which is incorporated by reference. More specifically, fluid 1042 from tank 1041 is delivered to electric motor 1025 through conduit 1020, and optional splitter 1022, to one or more inlets to governor interface integrated system 1005 where the fluid 1042 is used to move and adjust the pitch of the propulsor 1015 preferably by fluid pressure moving a piston.

In one or more embodiments, fluid 1042 used for the cooling system and as hydraulic working fluid in governor interface integrated system 1005, is also used by electric motor 1025 as lubrication, for example, for bearings and the like in the electric motor 1025. The fluid 1042 can be delivered to electric motor 1025 for use as a lubricant using conduit 1020 that is used to feed the governor interface integrated system 1005, and through splitter 1022 to conduit 1021, or through a conduit or channel separate from conduit 1020. One or more pumps may be included along conduits 1020 and/or 1021, and the governor interface integrated system 1005 or electric motor 1025 can include a pump to deliver fluid 1042 to electric motor 1025 for use as a lubricant or for governor interface integrated system 1005. In one or more embodiments, the one or more pumps 1043 can be electrically driven or mechanically driven by the electric motor 1025, and in an embodiment can be driven by an accessory gearbox integrated with the electric motor 1025, and in an aspect the accessory gearbox is powered by the main shaft of the electric motor.

In one or more embodiments, the same fluid 1042 that is used to cool the electric motor and motor controller 1050 is further optionally used (a) as the hydraulic working fluid in a governor interface system used to adjust the pitch of the propeller blade; (b) as lubricant fed into the governor interface system to lubricate one or more moving parts in the governor interface system; (c) as lubricant fed into the electric motor 1025 to lubricate one or more moving parts in the electric motor; and (d) as further lubricant in an accessory gearbox integrated with the electric motor 1025 and configured to drive accessories.

FIG. 10 illustrates a block diagram of the various communications, sensors, and feedback systems that can be used in the EPS 1000, and/or between the aircraft 1010 and the EPS 1000. For example, temperature sensors are included in motor controller 1050 and/or electric motor 1025. Temperature data from the temperature sensors in the electric motor 1025 is communicated via line 1061 to the motor controller 1050. The temperature data is processed by the motor controller 1050 and is used to provide alerts and indications of the operating states and health of components in the EPS 1000. In one or more embodiments, the electric motor 1025 also communicates other data with the motor controller 1050 via communication line 1035. For example, in one or more embodiments, the electric motor 1025 can communicate main shaft 1026 revolutions per minute (RPM), the angular position of the main shaft 1026 through a resolver sensor, and/or other data to the motor controller 1050 via communication and data line 1035. The motor controllers 1050 in an aspect process and monitor the data from electric motor to determine whether to adjust the speed and/or torque of the electric motor 1025. The motor controller 1050 in one or more embodiments outputs a discrete pulse width modulation (PMW) signal that is used to time the power circuits, control the power output of the motor controller 1050 or to control other EPU accessories, such as electrically driven pumps or electrically actuated mechanical and hydro-mechanical propeller governors via output 1053.

The motor controller 1050 in an embodiment as shown in FIG. 10 receives temperature data via temperature sensors associated with the cooling system 1040 via communication and data input 1065, and in an aspect also receives cooling system pressure information from pressure sensors associated with the cooling system 1040 via communication and data input 1066. In this manner the motor controller 1050 receives pressure and temperature information on the operations of the cooling system 1040 so that it can process the data and control and regulate the cooling system 1040. One aspect by which motor controller 1050 controls and regulates the cooling system 1040 is by communicating with and sending control signals 1065 to the one or more cooling system pumps 1043 via communication line and input 1065 to increase or decrease the flow of fluid 1042 in the cooling system 1040, and/or the motor controller 1050 can control the cooling system 1040 operations through other means.

The aircraft interface 1012 provides control information to control and regulate the EPS 1000. As shown in FIG. 10, the motor controller 1050 receives from the aircraft interface 1012 throttle control input 1070 which communicates how must torque and/or pitch to create by the electric motor 1025. The throttle control input 1070 in an aspect is analogue data. The motor controller 1050 receives the throttle control input 1070, processes the throttle control input 1070, and provides or varies the HVAC output 1056 to the electric motor 1025 to vary the torque provided by the electric motor 1025.

In an aspect, the aircraft interface 1012 and motor controller 1050 also communicate with each other via digital-Controller Area Network (CAN 1) communication and data line 1082 and via digital-Controller Area Network (CAN 2) communication and data line 1084. Digital-CAN 1 data line 1082 and Digital-CAN 2 data line 1084 are communication interfaces for digital information to and from the motor controller 1050 and the aircraft interface 1012. There are two (or more) CAN 1 and CAN 2 interfaces 1082, 1084 for redundancy. The information received from the aircraft 1010 can include initialization data, torque input commands, and control commands. The motor controller 1050 in one or more embodiments sends feedback on the operating parameters of the EPS 1010 to the aircraft interface 1012 over the CAN 1 and CAN 2 interfaces 1082, 1084, such as, for example, torque output, speed (RPM), current (power), operating states, and internal temperatures. It should be appreciated that other information can be transferred between motor controller 1050 and aircraft interface 1012 over CAN 1 interface 1082 and CAN 2 interface 1084. CAN 1 interface 1082 and CAN 2 interface 1084 can transmit the same information or different information between the motor controller 1050 and aircraft interface 1012. The motor controller 1050 can also have a discrete (safety loop) output 1085 to the aircraft interface 1012. The discrete output 1085 is in the form of a high/low signal indicating the status of the motor controller 1050 (fault or normal operation) that is used to trigger safety actions such as removal of the HVDC and/or shutting down components of EPS 1000, or other components. The motor controller 1050 in an embodiment also receives a discrete Electric Propulsion Unit (EPU) enable/disable signal 1086 from the aircraft interface 1012.

Figure 11:
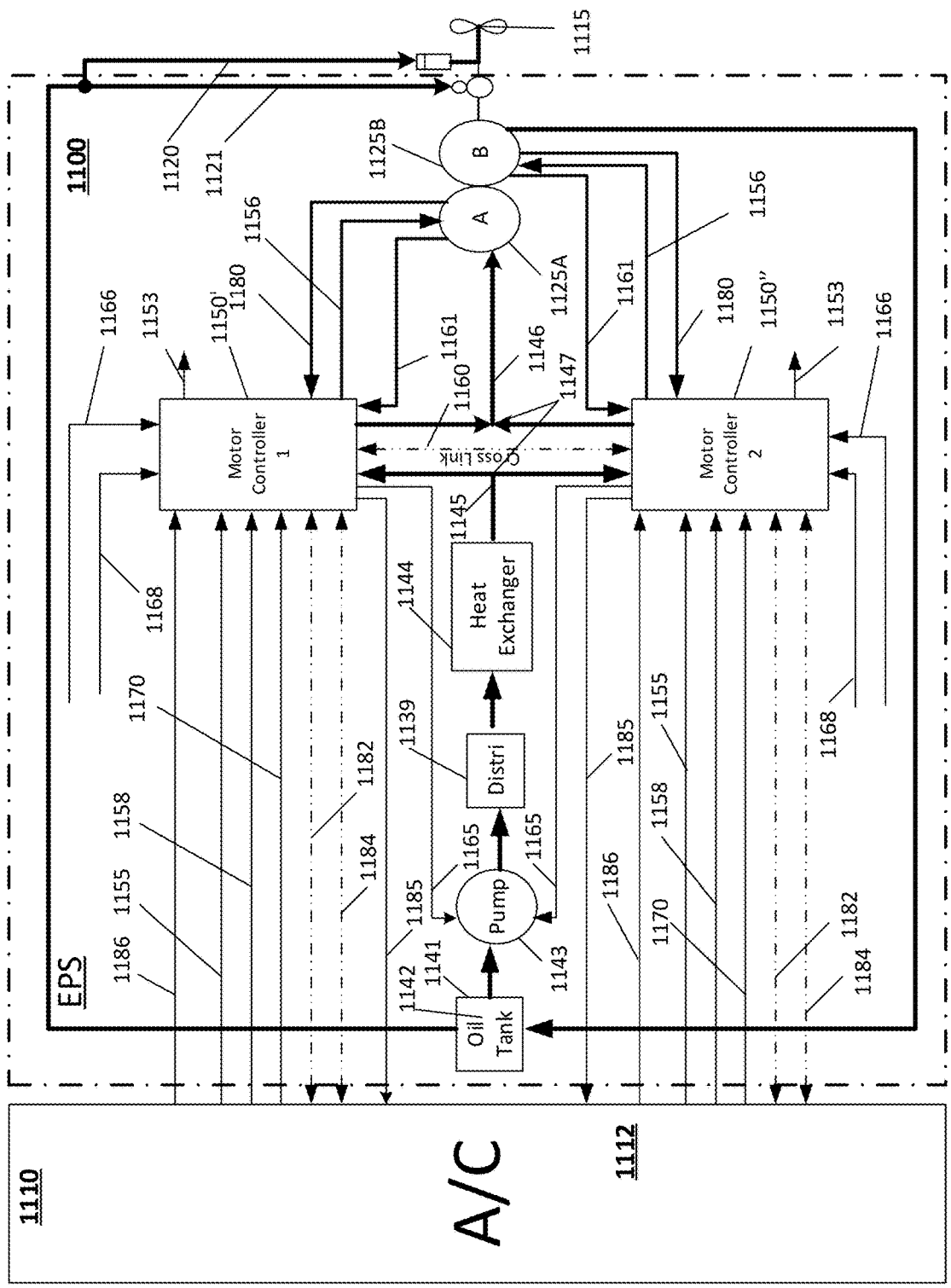
FIG. 11 shows a simplified block diagram of another embodiment of an EPS that is adapted for powering a propulsor driven aircraft.

Another embodiment of an electric propulsion system (EPS) for use as the main propulsion system in an electric aircraft 1110 is disclosed as shown in the illustrative simplified block diagram of FIG. 11. The EPS 1100 of FIG. 11, in one or more embodiments, comprises one or more electric motors 1125A, 1125B or motor modules 1125A, 1125B that provides the mechanical output to the main propulsor or propulsors 1115 of the aircraft 1110, and one or more motor controllers 1150', 1150" that convert aircraft control inputs and the electrical power from aircraft on-board energy sources, e.g., batteries, to the power, e.g., alternating-current (AC), required by the one or more electric motors or motor modules 1125. In the embodiment of FIG. 11, the motor controllers 1150 form an interface between the aircraft systems 1110 and the EPS 1100. The motor controller 1150 receives the power commands from the cockpit and provides various control functions in the system including supplying power to the electric motor or motor modules 1125A, 1125B to provide mechanical torque at the output of the main shaft 1126 of the electric motors or motor modules 1125A, 1125B. Other additional components may be included, and the EPS 1100 is not limited to the arrangement or type of components illustrated in FIG. 11.

The embodiment of the EPS 1100 shown in FIG. 11 is similar to the embodiment of EPS 1000 shown in FIG. 10, however, the EPS 1100 includes two motor controllers 1150', 1150' each powering and controlling one of two motor modules 1125A and 1125B (or two electric motors 1125A and 1125B). The inputs and outputs from each motor controller 1150 to its corresponding motor module 1125A, 1125B and the aircraft interface 1112 is similar to the inputs and outputs from the single motor controller 1050 to the single motor 1025 (or single motor module 1025) and aircraft interface 1012. That is the respective inputs and outputs 1186, 1155, 1158, 1170, 1182, 1184 and 1185 are the same type of inputs for each motor controller 1150' and 1150", and these respective inputs between motor controllers 1150', 1150" and the aircraft interface 1112 in FIG. 11 are the same as the respective inputs and outputs 1086, 1055, 1058, 1070, 1082, 1084 and 1085 described between motor controller 1050 and aircraft interface 1012 in connection with FIG. 10, and will not be repeated. Further, the respective inputs and outputs 1156, 1161 and 1180 between motor controller 1150' and respective motor or motor module 1125A in FIG. 11 are the same type of inputs and outputs between motor controller 1150" and respective motor or motor module 1125B, and are the same as the respective input and outputs 1056, 1061 and 1080 described between motor controller 1050 and electric motor 1025 in FIG. 10, and will not be repeated.

In the embodiment of FIG. 11, high-voltage, direct-current (HVDC) 1155, e.g., 400-800 volts, is supplied to each motor controller 1150', 1050" from the aircraft 1110, and each motor controller 1150 converts the incoming HVDC 1155 to high-voltage, alternating-current (HVAC) 1156 that is supplied to the electric motor 1125. Preferably each motor controller 1150 is constructed and configured as motor controller 1050 described in connection with FIG. 10.

FIG. 11 also illustrates a block diagram of the cooling system 1140 for EPS 1100, including the systems and components in the EPS 1100. The cooling system 1140 in an embodiment includes a reservoir or tank 1141 filled with fluid 1142, e.g., oil, one or more pumps 1143, one or more heat exchangers 1144, and a distribution unit 1139. More or less tanks 1141, pump systems 1143, and/or heat exchangers 1144 are contemplated for the EPS 1100. For example, multiple tanks 1141 can be used with one or more pumps 1143. As illustrated in FIG. 11 the cooling system 1140 includes conduit, channel, or pathway system 1145 that directs fluid 1143 to and through each electric motor controller 1150', 1150" and preferably through electric motor or motor module 1125A, and electric motor or motor module 1125B and returns via return 1137 to the reservoir or tank 1141. The cooling system 1140 could be configured to have cooling fluid 1142 flow through motor controllers 1150' and 1150" in parallel as shown in FIG. 11 or in series (not shown), and cooling fluid 1142 flows through electric motors or motor modules 1125A and 1125B in series as shown in FIG. 11 or in parallel (not shown). One or more pumps 1143 may be distributed throughout the conduit 1145. In one or more embodiments, the one or more pumps 1143 can be electrically driven or mechanically driven by the electric motor 1125, and in an embodiment can be driven by an accessory gearbox integrated with the electric motor 1125, and in an aspect the accessory gearbox is powered by the main shaft of the electric motor.

In one or more embodiments, as illustrated in FIG. 11, conduit 1146 extends between the motor controller 1050 and the electric motor 1025 so the same fluid 1042 flows through both the electric motors or motor modules 1125A, 1125B and both motor controllers 1150', 1150". The cooling system 1140 can include one or more splitters 1147 for separating the conduit or channel system 1145 and rejoining the conduit system 1145. The electric motors or motor modules 1125 can include one or more cooling inlets connected to channels 1145 to direct the cooling fluid 1142 to flow through the stator windings in the electric motors 1125 preferably as described and taught in PCT/AU2018/050553 (WO 2018/218314), the entirety of which is incorporated by reference. Each cooling inlet, outlet, and connecting cooling channel inside the electric motors 1125 can form an independent cooling path through the electric motors 1125, or multiple inlets and outlets can connect and communicate with a common channel though the electric motor 1125. Each motor controller 1150 preferably also includes one or more inlets to an internal channel to direct cooling fluid 1142 to flow into and through the housing of the motor controller 1150 to cool the circuits and components inside the motor controller housing, particularly the high-voltage, high-power circuits. Preferably the cooling channel inside the motor controller 1150 is formed with no seals so that fluid 1142 cannot enter or leak into the compartment of the motor controller 1150 where the circuitry is contained as described above. In an alternative embodiment, multiple independent cooling systems 1140 can also be included so that a cooling system used for the electric motors or motor modules 1125A, 1125B is separate from the cooling system used for the motor controllers 1150', 1150", and in a further embodiment each electric motor or motor module 1125A, 1125B can have a separate cooling system 1140, and each motor controller 1150', 1150" can have a separate cooling system.

In one or more embodiments, the same fluid 1142 that is used to cool the electric motor and motor controller 1150 is further optionally used (a) as the hydraulic working fluid in a governor interface system used to adjust the pitch of the propeller blade; (b) as lubricant fed into the governor interface system to lubricate one or more moving parts in the governor interface system; (c) as lubricant fed into the electric motor 1125 to lubricate one or more moving parts in the electric motor; and (d) as further lubricant in an accessory gearbox integrated with the electric motor 1125 and configured to drive accessories.

Each motor controller 1150', 1150" in an embodiment as shown in FIG. 11 receives temperature data via temperature sensors associated with the cooling system 1140 via communication and data input 1166, and in an aspect also receives cooling system pressure information from pressure sensors associated with the cooling system 1140 via communication and data input 1168. In this manner, each motor controller 1050 independently receives pressure and temperature information on the operations of the cooling system 1140 so that each motor controller 1150', 1150" can independently control and regulate the cooling system 1140. One aspect by which each motor controller 1150', 1150" controls and regulates the cooling system 1140 is by independently communicating with and sending control signals 1165 to the one or more cooling system pumps 1143 via communication line and input 1165 to increase or decrease the flow of fluid 1142 in the cooling system 1140, and/or each motor controller 1150', 1150" can control the cooling system 1140 operations through other means.

EPS system 1100 also delivers fluid 1142 used in cooling system 1140 to electric motor 1025 through conduit or channel 1120 for use with governor interface integrated system 1105 to adjust the pitch of the propulsor 1115, e.g., propeller 1115, as described above. More specifically, fluid 1142 from tank 1141 is delivered to electric motor 1125 through conduit 1120, and optional splitter 1122, to one or more inlets to the governor interface integrated system 1105 where the fluid 1142 is used to move and adjust the pitch of the propulsor 1115 preferably by fluid pressure moving a piston. In one or more embodiments, fluid 1142 used for the cooling system and as hydraulic working fluid in governor interface integrated system 1105, is also used by electric motor 1125 as lubrication, for example, for bearings and the like in the electric motor 1125. The fluid 1142 can be delivered to electric motor 1125 for use as a lubricant using conduit 1120 that is used to feed the governor interface integrated system 1105, and through splitter 1122 to conduit 1121, or through a conduit or channel separate from conduit 1120. One or more pumps may be included along conduits 1120 and/or 1121, and the governor interface integrated system 1105 or electric motor may include a pump to deliver fluid 1142 to electric motor 1125 for use as a lubricant or for governor interface 1105.

The EPS 1100 in FIG. 11 has two separate motor controllers 1150' and 1150" which in an aspect communicate with each other over communication link 1160. In this manner, the two motor controllers can communicate and double check system sensors and information and determine for example if there are certain faults in the EPS system 1100. In addition, having two motor controllers 1150 provides a redundancy to the EPS system 1100 where the EPS 1100 remains operational to provide torque to motor 1125 in the event one of the motor controllers fails. Each motor controller 1150 in one or more embodiments outputs a discrete pulse width modulation (PMW) signal that is used to time the power circuits, control the power output of the respective motor controller 1150', 1150" or control other EPU accessories, such as electrically driven pumps or electrically actuated mechanical and hydro-mechanical propeller governors via output 1153.

A system to convert electrical power to torque is disclosed where in one or more embodiments the system includes: one or more motor controllers, each motor controller adapted and configured to receive power input commands and to receive high-voltage, direct-current (HVDC) input power and convert the HVDC input power to multiphase high-voltage, alternating-current (HVAC) output power, wherein each motor controller varies its respective multiphase HVAC output power in response to the power input commands received; an electric motor assembly having a main shaft for supplying torque, the electric motor configured and adapted to receive input power as multiphase HVAC from the one or more motor controllers to rotate the main shaft; and a liquid cooling system having a liquid coolant, wherein the liquid coolant is configured to flow through both the electric motor assembly and at least one of the motor controllers. In an aspect, each of the one or more motor controllers has a housing, wherein the liquid coolant flows through the housing of at least one of the motor controllers. The electric motor assembly in an embodiment includes: one or more stator modules, each stator module having a plurality of stator windings configured to receive HVAC power from the one or more motor controllers; one or more rotor assemblies, each rotor assembly having a plurality of magnets arranged around the outer periphery of a hub, wherein at least one of the one or more rotor assemblies is configured to rotate the main shaft, and at least one or more of the rotor assemblies is associated with, concentrically contained within, and rotatable relative to one of the one or more stator modules, and wherein the liquid coolant flows through at least one of a group of the plurality of stator windings. The system in one or more arrangements includes at least two motor controllers and the system is configured so that the liquid coolant flows through at least two of the housings of the motor controllers in parallel and through the electric motor assembly in series with the at least two motor controllers.

The liquid cooling system in an aspect contains one or more temperature sensors and data from the temperature sensors is communicated to one or more of the motor controllers for processing, and additionally or alternatively contains one or more pressure sensors and data from the pressure sensors is communicated to one or more of the motor controllers for processing. The cooling system in an embodiment further contains a reservoir to contain the liquid coolant, a conduit system to channel the liquid coolant at least between the one or more motor controllers and the electric motor, and at least one pump to pump the liquid coolant. The one or more motor controllers preferably are configured to produce and supply two independent multiphases of HVAC output power, preferably three-phase HVAC, and each stator module in the electric motor is configured to receive at least two independent multiphases of HVAC output power from the one or more motor controllers. A single motor controller having a single housing with a single cooling channel to receive liquid coolant in an aspect produces and supplies the two independent multiphases of HVAC output power, wherein the single motor controller contains two independent circuits, each to produce one of the independent multiphase HVAC outputs.

The electric motor assembly in an embodiment is configured to receive fluid as a lubricant to lubricate one or more moving parts within the electric motor assembly, wherein the same fluid used as lubricant in the electric motor assembly is used as coolant in the cooling system. The system optionally further includes an integrated accessory gearbox assembly that derives power from the electric motor assembly, wherein the integrated accessory gearbox is configured to receive fluid as a lubricant to lubricate one or more moving parts within the accessory gearbox assembly, wherein the same fluid used as a lubricant in the integrated gearbox assembly is used as coolant in the cooling system. In an aspect, the same fluid used as a lubricant in the electric motor assembly and the gearbox is used as coolant for the cooling system and is taken from a common reservoir. The system optionally includes an integrated accessory gearbox assembly that derives power from the electric motor assembly, wherein the integrated accessory gearbox is configured to power the pump.

The system in one or more embodiments is configured as a propulsion system, wherein the shaft of the electric motor assembly is configured to supply torque to a propulsor of an aircraft. The system optionally further includes a governor interface assembly to adjust the pitch of the propulsor element, wherein the governor interface derives a speed reference of the propulsor element from the main shaft of the electric motor assembly and utilizes hydraulic fluid to adjust the pitch of the propulsor element, wherein the hydraulic fluid used to adjust the pitch of the propulsor element is the same fluid used in the cooling system. In an aspect, the integrated gearbox is configured to receive lubricant fluid to lubricate one or more moving parts within the gearbox assembly, and wherein the electric motor is configured to receive the lubricant to lubricate one or more moving parts within the electric motor assembly, and the lubricant fluid used for the motor and/or the accessory gearbox, the hydraulic fluid in the governor interface assembly, and the liquid coolant are all the same fluid taken from a common reservoir.

The system optionally has two or more motor controllers, wherein at least two motor controllers communicate over a high speed bus, and the system is capable of operating if one of the two or more motor controllers is degraded, faulty, or inoperable. Each motor controller according to an embodiment has at least two digital Controller Area Network communication interfaces to receive power input commands, wherein at least one the digital Controller Area Network communication interfaces is redundant. The motor controller optionally receives temperature data from the electric motor, and additionally or alternatively receives information on the main shaft of the electric motor including at least one of the group consisting of speed, angular position, and combinations thereof. In an aspect, the system includes one or more system controllers for receiving control input and outputting power input commands to one or more motor controllers.

The electric motor used in the EPS preferably uses a stator module that features two or more independent multiphase windings. The modular electric motor uses two (dual), 3-phase architecture which provides redundancy and graceful degradation should a fault occur. It can be appreciated that each motor module in the electric motor can have more or less separate windings, more or less electric HVAC phases, and more or less electric power connector boxes. The power supplied to the electric motor in the EPS is controlled and regulated by the motor controller to produce torque and/or regulate the rotational speed of the main shaft in the electric motor. The motor controller is also responsible for identifying and managing fault conditions that arise within the electric motor and within the motor controller itself. By having two independent motor controllers controlling motor modules that are independent and each supply power to the electric motor, faults within either the electric motor controller or the electric motor can be contained within the affected module.

The EPS systems have electric motors that use liquid cooling as does the motor controller or power supply unit use liquid cooling and in one or more embodiments both the electric motor(s) and motor controller(s) use the same liquid coolant in an aspect in the same single system to achieve high thermal performance and efficiency. In an embodiment, the electric motor includes a governor interface integrated system optionally attached to the common shaft of the electric motor to provide hydraulic fluid to the propulsor to adjust the pitch of the propulsor elements (e.g., the propeller blades), provide a speed reference from the main shaft of the electric motor to the governor, and regulate the speed of the main shaft of the electric motor. The governor interface integrated system can be mounted at the front or rear of the electric motor, and in an embodiment the hydraulic fluid used to adjust the pitch of the propulsor is also the same fluid used to cool the EPS, e.g., flow through the electric motor(s) and the motor controller(s). In yet a further embodiment, the same fluid used to cool the electric motor(s) and/or the electric motor controller(s) is feed to the electric motor as a lubricant to lubricate the bearing and/or other components in the electric motor. In another embodiment the same fluid used to cool the electric motor(s) and/or the electric motor controller(s) is feed to the governor interface assembly for use as a hydraulic fluid to adjust the pitch of the proppulsor and is feed to the electric motor for use as a lubricant.

With respect to the above description, it is to be realized that the dimensional relationship for the parts of the system includes variations in size, materials, shape, form, function and the manner of operation as would be known to one skilled in the art, and all equivalent relationships to those illustrated in the drawings and described in the specification are intended to be encompassed by the invention.

In the claims, the term "comprises/comprising" does not exclude the presence of other elements, features, or steps. Furthermore, although individually listed, a plurality of means, elements, or method steps may be implemented by, e.g., a single unit, element, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not preclude a plurality. Reference signs or characters in the disclosure and/or claims are provided merely as a clarifying example and shall not be construed as limiting the scope of the claims in any way.

Those skilled in the art will recognize that the disclosed and illustrated EPS has many applications, may be implemented in various manners and, as such is not to be limited by the foregoing embodiments and examples, but it is intended to cover modifications within the spirit and scope of the invention. For example, use of the EPS in helicopters or other mobile vehicles is contemplated. While fundamental features of the invention have been shown and described in exemplary embodiments, it will be understood that omissions, substitutions, and changes in the form and details of the disclosed embodiments of the EPS may be made by those skilled in the art without departing from the spirit of the invention. Any number of the features of the different embodiments described herein may be combined into a single embodiment. The locations of particular elements, for example, the cooling system, the power connections, the electric power connector boxes, the sensors and communication lines, etc., may be altered.

Alternate embodiments are possible that have features in addition to those described herein or may have less than all the features described. Functionality may also be, in whole or in part, distributed among multiple components, in manners now known or to become known. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

We claim:

1. A system to convert electrical power to torque configured as a propulsion system, the system comprising:
at least two motor controllers, each motor controller adapted and configured to receive power input commands and to receive direct-current (DC) input power and convert the DC input power to multiphase alternating-current (AC) output power, wherein each motor controller varies its respective multiphase AC output power in response to the power input commands received and each of the at least two motor controllers has a housing;
an electric motor assembly having a main shaft for supplying torque to a propulsor element of an aircraft, the electric motor configured and adapted to receive input power as multiphase AC from the at least two motor controllers to rotate the main shaft, wherein the electric motor assembly comprises one or more stator modules, each stator module having a plurality of stator windings configured to receive the AC output power from the at least two motor controllers;
a governor interface assembly to adjust the pitch of the propulsor element, wherein the governor interface derives a speed reference of the propulsor element from the main shaft of the electric motor assembly and utilizes hydraulic fluid to adjust the pitch of the propulsor element; and
a liquid cooling system having a liquid coolant, wherein the liquid cooling system is configured to direct the liquid coolant to flow through the plurality of stator windings in at least one of the one or more stator modules to cool the plurality of stator windings in the at least one of the one or more stator modules and so that the same liquid coolant that flows through the plurality of stator windings flows through the housing of the at least two motor controllers in parallel to cool the at least two motor controllers and through the electric motor assembly in series with the at least two motor controllers, and wherein the hydraulic fluid used to adjust the pitch of the propulsor element is the same fluid used in the cooling system.

2. The system of claim 1, wherein the electric motor assembly comprises:
one or more rotor assemblies, each rotor assembly having a plurality of magnets arranged around the outer periphery of a hub, wherein at least one of the one or more rotor assemblies is configured to rotate the main shaft, and at least one or more of the rotor assemblies is associated with, concentrically contained within, and rotatable relative to one of the one or more stator modules.

3. The system of claim 1, wherein the liquid cooling system contains one or more temperature sensors and data from the temperature sensors is communicated to one or more of the at least two motor controllers for processing.

4. The system of claim 1, wherein the liquid cooling system contains one or more pressure sensors and data from the pressure sensors is communicated to one or more of the at least two motor controllers for processing.

5. The system of claim 1, wherein the cooling system further contains a reservoir to contain the liquid coolant, a conduit system to channel the liquid coolant at least between the at least two motor controllers and the electric motor assembly, and at least one pump to pump the liquid coolant.

6. The system of claim 5, further comprising an integrated accessory gearbox assembly that derives power from the electric motor assembly, wherein the integrated accessory gearbox is configured to power the pump.

7. The system of claim 2, wherein each one of the at least two motor controllers is are configured to produce and supply two independent multi-phases of AC output power and each stator module in the electric motor assembly is configured to receive at least two independent multiphases of AC output power from at least one of the at least two motor controllers.

8. The system of claim 7, wherein a single motor controller having a single housing with a single cooling channel to receive liquid coolant produces and supplies the two independent multi-phases of AC output power, wherein the single motor controller contains two independent circuits, each to produce one of the independent multiphase AC outputs.

9. The system of claim 1, wherein the electric motor assembly is configured to receive fluid as a lubricant to lubricate one or more moving parts within the electric motor assembly, wherein the same fluid used as lubricant in the electric motor assembly is used as coolant in the cooling system.

10. The system of claim 1, further comprising an integrated accessory gearbox assembly that derives power from the electric motor assembly, wherein the integrated accessory gearbox is configured to receive fluid as a lubricant to lubricate one or more moving parts within the accessory gearbox assembly, wherein the same fluid used as a lubricant in the integrated gearbox assembly is used as coolant in the cooling system.

11. The system of claim 1, further comprising an integrated gearbox assembly that derives power from the electric motor assembly, wherein the integrated gearbox is configured to receive lubricant fluid to lubricate one or more moving parts within the gearbox assembly, and wherein the electric motor assembly is configured to receive the lubricant to lubricate one or more moving parts within the electric motor assembly, and the lubricant fluid, the hydraulic fluid, and the liquid coolant are all the same fluid taken from a common reservoir.

12. The system of claim 1, wherein the at least two motor controllers communicate over a bus, and the system is capable of operating if one of the at least two motor controllers is degraded, faulty, or inoperable.

13. The system of claim 1, further comprising one or more system controllers for receiving control input and outputting power input commands to at least one of the at least two motor controllers.

14. The system of claim 1, wherein at least one of the at least two motor controllers has at least two digital Controller Area Network communication interfaces to receive power input commands, wherein at least one the digital Controller Area Network communication interfaces is redundant.

15. The system of claim 1 wherein at least one of the at least two motor controllers receives temperature data from the electric motor assembly.

16. The system of claim 1, wherein the motor controller receives information on the main shaft of the electric motor assembly including at least one of the group consisting of speed, angular position, and combinations thereof.

17. The system of claim 1, wherein at least one of the at least two motor controllers are configured to received direct current input power of between 400-800 volts.

18. The system of claim 1, wherein the liquid coolant is configured to flow through the plurality of stator windings and to flow serially through the at least two motor controllers.

19. The system of claim 18, further comprising a motor lubricant fluid to lubricate one or more moving parts within the electric motor assembly, wherein the same motor lubricant fluid within the electric motor assembly is the same coolant fluid that flows through and in contact with the plurality of stator windings.

* * * * *